United States Patent
GALPiN et al.

(10) Patent No.: US 11,653,014 B2
(45) Date of Patent: May 16, 2023

(54) METHOD AND APPARATUS FOR ENCODING AND DECODING AN OMNIDIRECTIONAL VIDEO

(71) Applicant: InterDigital Madison Patent Holdings, SAS, Paris (FR)

(72) Inventors: Franck GALPiN, Cesson-Sevigne (FR); Fabrice Leleannec, Cesson-Sevigne (FR); Gagan Rath, Cesson-Sevigne (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 16/634,142

(22) PCT Filed: Jul. 10, 2018

(86) PCT No.: PCT/EP2018/068621
§ 371 (c)(1),
(2) Date: Jan. 25, 2020

(87) PCT Pub. No.: WO2019/020360
PCT Pub. Date: Jan. 31, 2019

(65) Prior Publication Data
US 2020/0213609 A1 Jul. 2, 2020

(30) Foreign Application Priority Data
Jul. 25, 2017 (EP) ...................................... 17305997

(51) Int. Cl.
*H04N 19/513* (2014.01)
*H04N 19/176* (2014.01)
(Continued)

(52) U.S. Cl.
CPC ......... *H04N 19/513* (2014.11); *H04N 19/176* (2014.11); *H04N 19/62* (2014.11); *H04N 19/85* (2014.11)

(58) Field of Classification Search
CPC .... H04N 19/513; H04N 19/176; H04N 19/62; H04N 19/85; H04N 19/56; H04N 19/593
See application file for complete search history.

(56) References Cited

U.S. PATENT DOCUMENTS

| 9,661,376 B2* | 5/2017 | Botzko ............ H04N 21/64738 |
| 2016/0360231 A1 | 12/2016 | Yuan et al. |
| 2019/0215532 A1* | 7/2019 | He ........................ H04N 19/172 |
| 2019/0260989 A1* | 8/2019 | Racape .................. H04N 19/46 |

FOREIGN PATENT DOCUMENTS

| CN | 104170381 A | 11/2014 |
| CN | 104662909 A | 5/2015 |

(Continued)

OTHER PUBLICATIONS

Alouache et al., "Motion Estimation for Omnidirectional Images using the Adapted Block-Matching", International Journal of Image, Graphics and Signal Processing, vol. 6, No. 9, Aug. 2014, pp. 20-26.
(Continued)

*Primary Examiner* — Joseph W Becker
(74) *Attorney, Agent, or Firm* — Condo Roccia Koptiw LLP

(57) ABSTRACT

A method for decoding a large field of view video is disclosed. At least one picture of said large field of view video is represented as a 3D surface projected onto at least one 2D picture using a projection function. The method comprises, for at least one current block of said 2D picture: —determining whether an absolute value of at least one component of a motion vector (d V) associated with another block of said 2D picture satisfies a condition; —transforming, based on said determining, said motion vector (d V) into
(Continued)

a current motion vector (d P) associated with said current block responsive to said projection function; and —decoding said current block using said current motion vector (d P).

14 Claims, 26 Drawing Sheets

(51) Int. Cl.
*H04N 19/62* (2014.01)
*H04N 19/85* (2014.01)

(56) References Cited

FOREIGN PATENT DOCUMENTS

| EP | 3301930 A1 | 4/2018 |
|----|------------|--------|
| WO | 2013138631 A1 | 9/2013 |
| WO | 2014043374 A1 | 3/2014 |

OTHER PUBLICATIONS

Jin et al., "Motion Estimation and Compensation for Fisheye Warped Video", 2015 IEEE international Conference on Image Processing (ICIP), Quebec City, Canada, Sep. 27, 2015, pp. 2751-2755.

Alouache et al., "An Adapted Block-Matching Method for Optical Flow Estimation in Catadioptric Images", 2014 International Conference on Multimedia Computing and Systems (ICMCS), Marrakech, Morocco, Apr. 14, 2014, 6 pages.

De Simone et al., "Deformable Block-Based Motion Estimation in Omnidirectional Image Sequences", 2017 IEEE 19th International Workshop on Multimedia Signal Processing (MMSP), Luton, United Kingdom, Oct. 16, 2017, 6 pages.

Bao et al., "Viewing 360 Degree Videos: Motion Prediction and Bandwidth Optimization", 2016 IEEE 24th International Conference on Network Protocols (ICNP), Singapore, Singapore, Nov. 8, 2016, 2 pages.

* cited by examiner

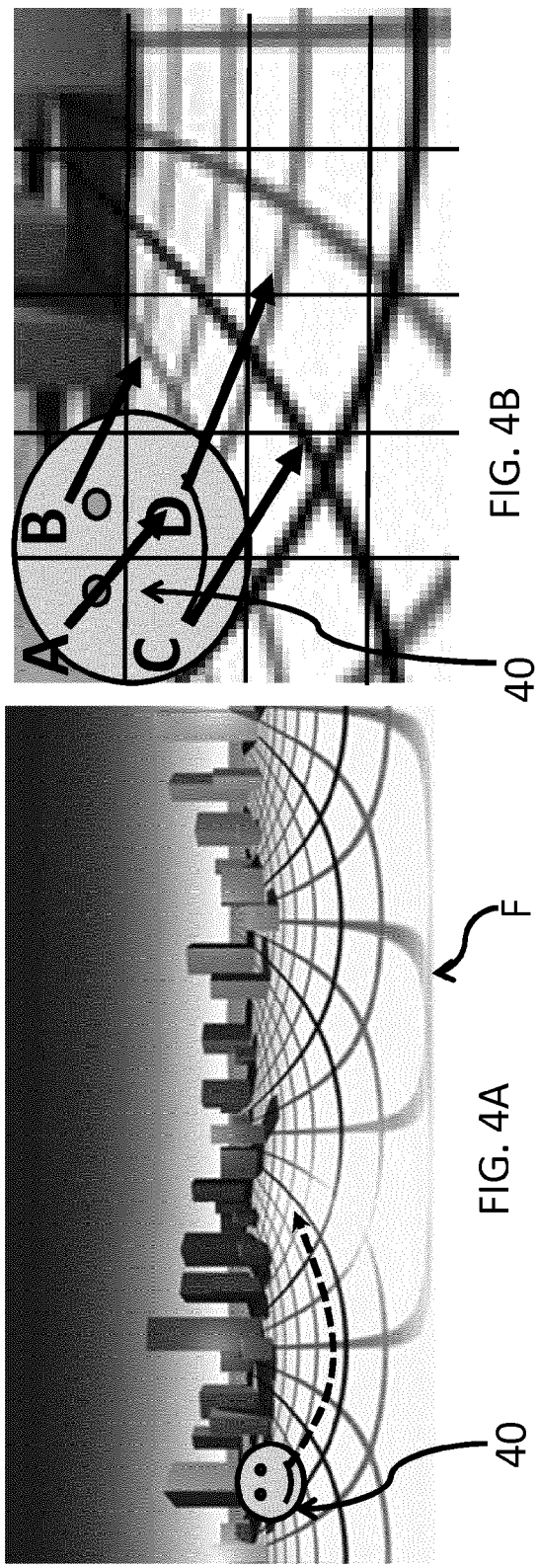
FIG. 4A
FIG. 4B
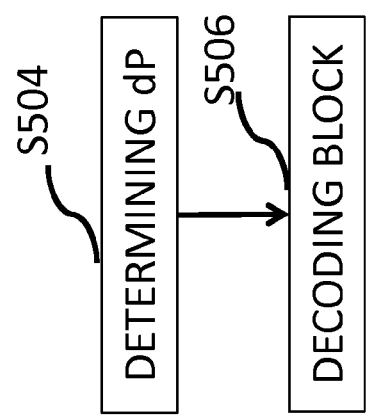
FIG. 5A
FIG. 5B

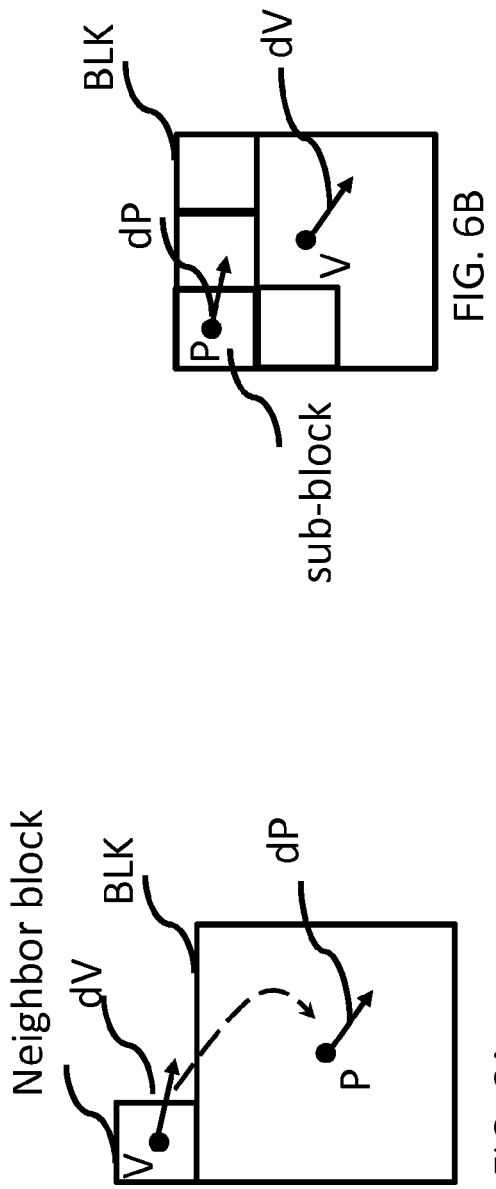
FIG. 6A
FIG. 6B
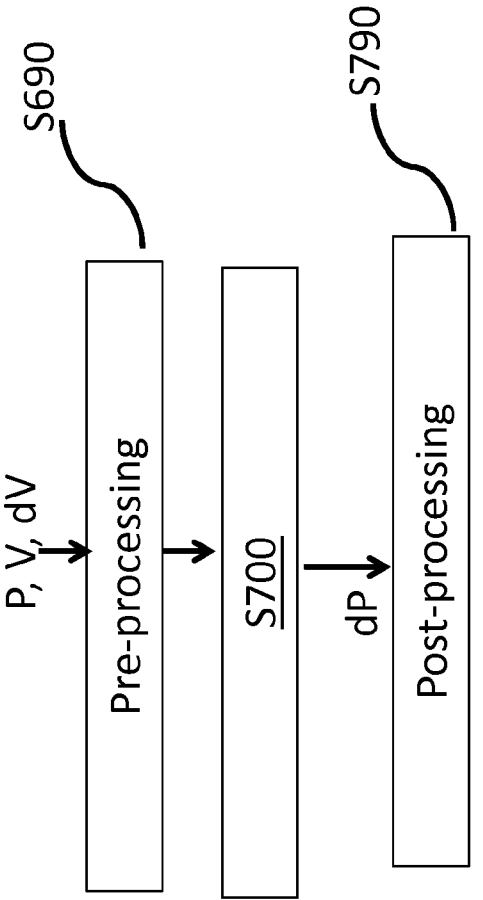
FIG. 7B

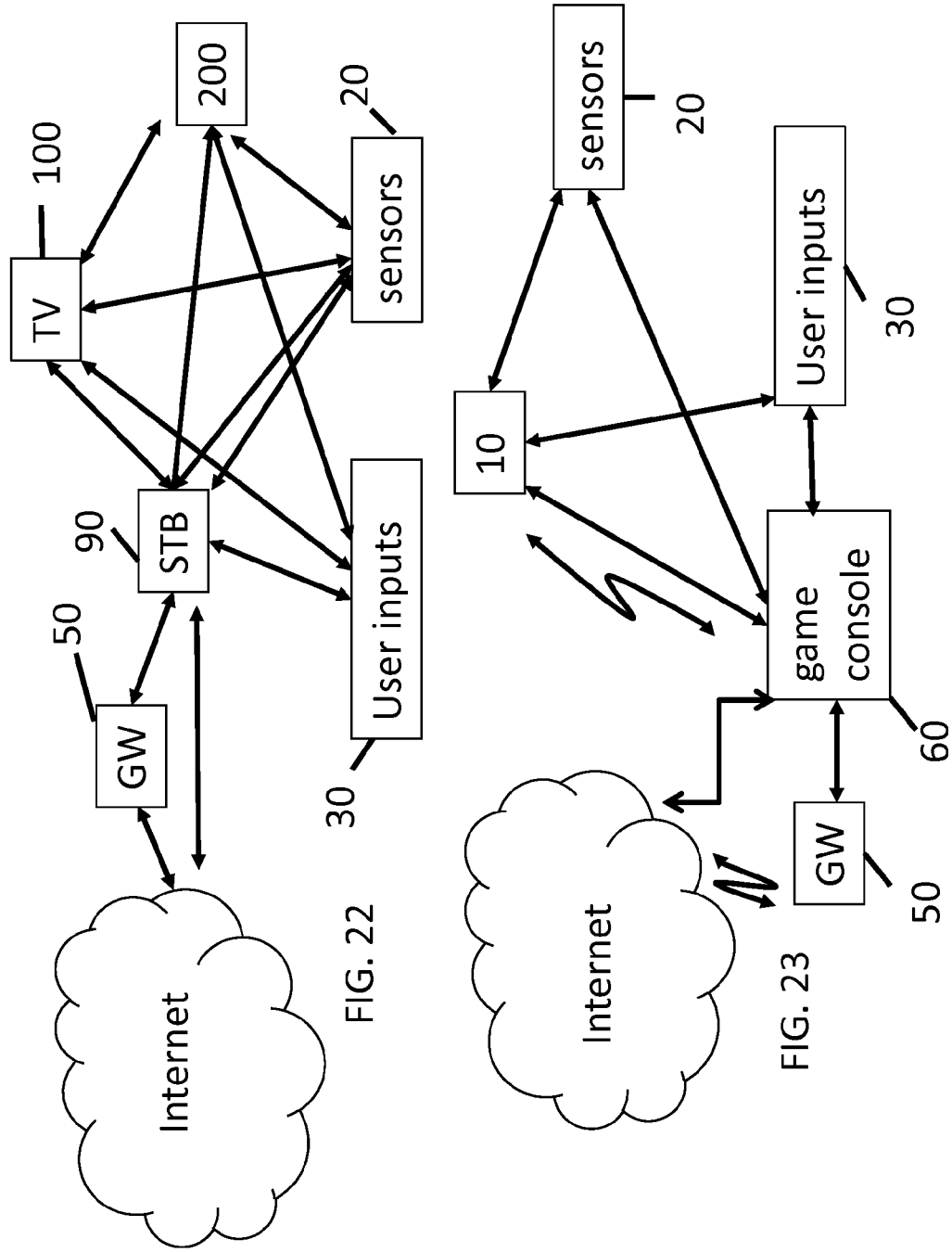

METHOD AND APPARATUS FOR ENCODING AND DECODING AN OMNIDIRECTIONAL VIDEO

CROSS REFERENCE TO RELATED APPLICATIONS

This application is the national stage entry under 35 U.S.C. § 371 of International Application PCT/EP2018/068621, filed Jul. 10, 2018, which was published in accordance with PCT Article 21(2) on Jan. 31, 2019, in English, and which claims the benefit of European Patent Application No. 17305997.3, filed Jul. 25, 2017.

1. TECHNICAL FIELD

A method and an apparatus for encoding a large field of view video, wherein at least one picture of said large field of view video being represented as a 3D surface, said surface being projected onto at least one 2D picture using a projection function. Corresponding decoding method and apparatus are further disclosed.

2. BACKGROUND

Recently there has been a growth of available large field of view content (up to 360°). Such content is potentially not fully visible by a user watching the content on immersive display devices such as Head Mounted Displays (HMD), smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Figure 1:
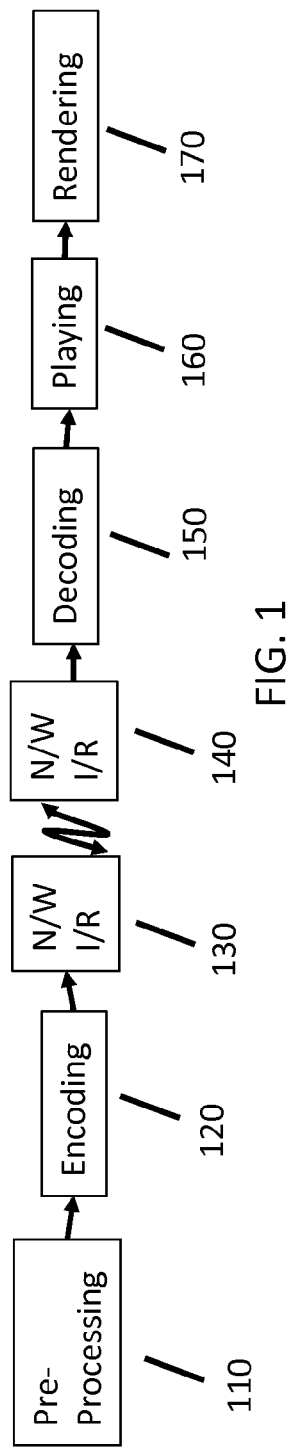

The projection of the 3D surface onto a 2D picture may introduce some distortions such as geometry distortions. For instance, straight lines are not straight anymore, orthonormal coordinate system are not orthonormal anymore. In the case of motion representation between successive pictures of the omnidirectional video, the motion inside a block on the 3D surface can be considered homogenous. However, such assertion is no longer true when the block of the 3D surface is projected on a 2D picture.

FIG. 4A illustrates a projected picture F of a 3D surface representing an omnidirectional video in which an object 40 moves along a trajectory. In the scene represented by the omnidirectional video, the object 40 moves along a straight line. The resulting apparent motion in the projected picture F is represented as dotted line. The resulting motion vectors for an arbitrary block partitioning of the picture F is shown on FIG. 4B. As one can notice, even if the motion is perfectly straight in the rendered picture, the picture F to encode shows non-uniform motion vectors. For blocks A, B, C and D carrying information of the moving object 40, the motion vectors are all different.

In classical video coding, motion vectors are predictively coded using motion vector predictors which are determined from neighboring blocks. For instance, motion vector of block D is predicted from motion vectors of blocks A, B and/or C.

After projection of the 3D surface S on a 2D picture F, the neighbor motion vector may be unsuitable for prediction in the case where they are very different from the motion vector of block D. In such a case, the prediction residue to encode may be very large and thus costly to encode.

Therefore, there is a need for a new method and apparatus of encoding and decoding omnidirectional videos.

3. SUMMARY

A method for decoding a large field of view video is disclosed. At least one picture of said large field of view video is represented as a 3D surface projected onto at least one 2D picture using a projection function. The method comprises, for at least one current block of said 2D picture:
  determining whether an absolute value of at least one component of a motion vector associated with another block of said 2D picture satisfies a condition;
  transforming, based on said determining, said motion vector into a current motion vector associated with said current block responsive to said projection function; and
  decoding said current block using said current motion vector.

An apparatus for decoding a large field of view video is also disclosed. The apparatus comprises:
  means for determining whether an absolute value of at least one component of a motion vector associated with another block of said 2D picture satisfies a condition;
  means for transforming, based on said determining, said motion vector into a current motion vector associated with said current block responsive to said projection function; and
  means for decoding said current block using said current motion vector.

A method for encoding a large field of view video is also disclosed. At least one picture of said large field of view video is represented as a 3D surface projected onto at least one 2D picture using a projection function. The method comprises, for at least one current block of said 2D picture:
  determining whether an absolute value of at least one component of a motion vector associated with another block of said 2D picture satisfies a condition;
  transforming, based on said determining, said motion vector into a current motion vector associated with said current block responsive to said projection function; and
  encoding said current block using said current motion vector.

An apparatus for encoding a large field of view video is dislosed. The apparatus comprises:
  means for determining whether an absolute value of at least one component of a motion vector associated with another block of said 2D picture satisfies a condition;
  means for transforming, based on said determining, said motion vector into a current motion vector associated with said current block responsive to said projection function; and
  means for said current block using said current motion vector.

In an exemplary embodiment, determining whether an absolute value of at least one component of said motion vector satisfies a condition comprises determining whether an absolute value of at least one component of said motion vector is larger than a value and wherein transforming, based on said determining, said motion vector comprises applying said transforming in the case where said absolute value is lower than said value and skipping said transforming otherwise.

In another exemplary embodiment, determining whether an absolute value of at least one component of said motion vector satisfies a condition comprises determining whether an absolute value of at least one component of said motion vector is larger than a value and wherein transforming, based on said determining, said motion vector comprises, in the case where said absolute value is larger than said value, clipping the at least one component so that the absolute value of said at least one component is equal to said value and applying said transforming with the clipped at least one component.

Advantagesouly, the methods further comprise clipping dVy to h−Vy in the case where Vy+dVy is larger than the height h of the picture, and clipping dVy to −Vy in the case where Vy+dVy is lower than 0, where dVy is an ordinate of said motion vector (dV) and Vy is an ordinate of a point V of said another block, and applying said transforming with the clipped dVy. The encoding and decoding apparatus comprise corresponding means for clipping.

According to a specific characteristic, the value is equal to w/8 or h/4, where w is the width of and h is the height of said picture.

In an embodiment, the methods further comprise after said transforming, determining whether an absolute value of at least one component difference between said current motion vector and said motion vector is larger than another value and, in the case where said absolute value is larger than said another value, clipping the at least one component of said current motion vector so that the absolute value of said at least one component difference is equal to said another value. In the same way, the encoding and decoding apparatus comprise corresponding means for determining whether an absolute value of at least one component difference between said current motion vector and said motion vector is larger than another value.

In an embodiment, the methods further comprise after said transforming, clipping dPy to h−Py in the case where Py+dPy is larger than the height of the picture and clipping dPy to −Py in the case where Vy+dVy is lower than 0, where h is the height of the picture, dPy is an ordinate of said current motion vector and Py is an ordinate of a point P of the current block. In the same way, the encoding and decoding apparatus comprise corresponding means for clipping.

In an embodiment, the methods further comprise after said transforming, clipping dPx to w+C−Px in the case where Px+dPx>w+C and clipping dPx to −C−Px in the case where Px+dPx<−C, where w is a width of said picture, C is a value, dPx is an abscissa of said current motion vector (dP) and Px is an abscissa of a point P of the current block. In the same way, the encoding and decoding apparatus comprise corresponding means for clipping.

According to a specific characteristic, the 3D surface is a sphere.

In an embodiment, transforming the motion vector associated with another block of said 2D picture into the current motion vector associated with said current block responsive to said projection function comprises:

a) projecting on the surface a point P of the current block to a point P''', a point V of said another block to a point V''' and the point V of said another block displaced by the motion vector to a point W''';

b) determining an intersection Vp between a vector OV''' and a plane G and an intersection Wp between a vector OW''' and the plane G, wherein the plane G is a plane tangent in P''' to the surface, O is the origin of the sphere;

c) displacing P''' by dVp to obtain a point Qp in the plane G, wherein dVp is equal to the vector VpWp;

d) projecting the point Qp in the 2D picture to a point Q; and e) determining the current motion vector for said current block as a vector from P to Q.

A computer program comprising software code instructions for performing the encoding and decoding methods when the computer program is executed by a processor is disclosed.

An immersive rendering device comprising an apparatus for decoding a bitstream is disclosed.

4. BRIEF DESCRIPTION OF THE DRAWINGS

Figure 2:
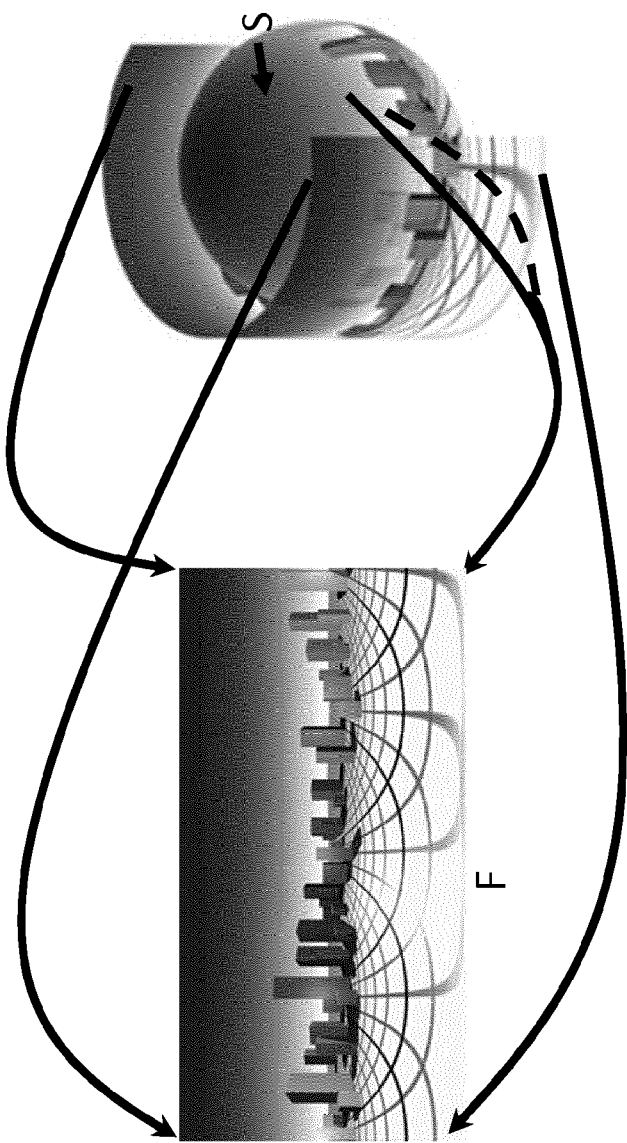
FIG. 2 shows an example of projection from a surface S represented as a sphere onto one single rectangular picture F using an Equi-Rectangular Projection (ERP).
Figure 3A:
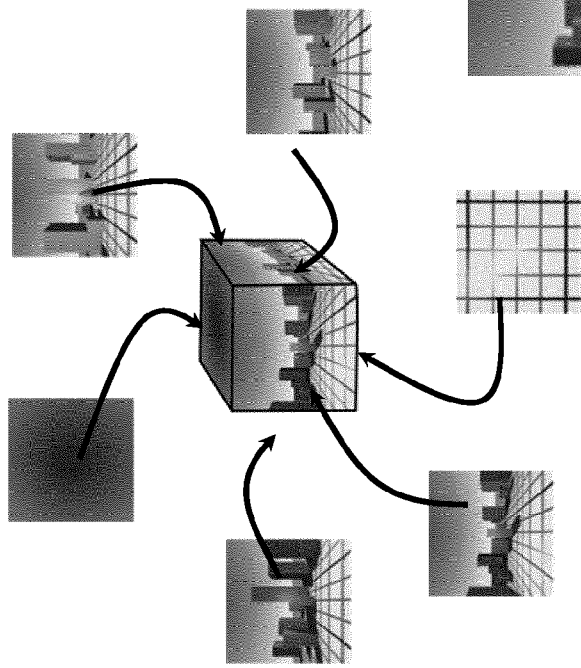
FIG. 3A shows another example of projection from the surface S, here represented as a cube, onto six pictures or faces. The faces of the cube can possibly be re-arranged into one single picture as shown in FIG. 3B.
Figure 3B:
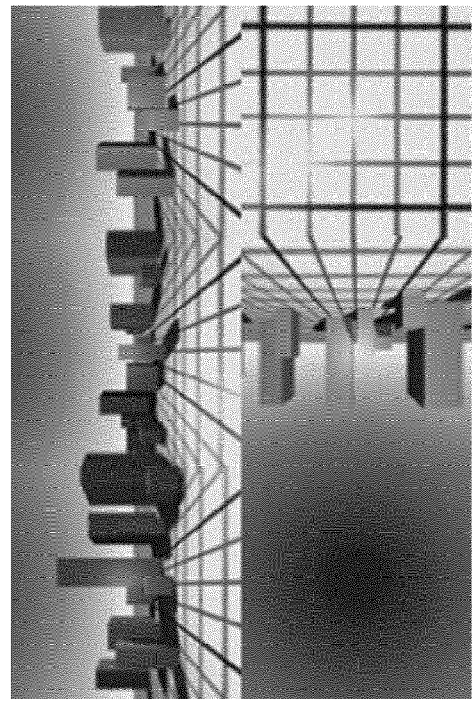
Figure 7A:
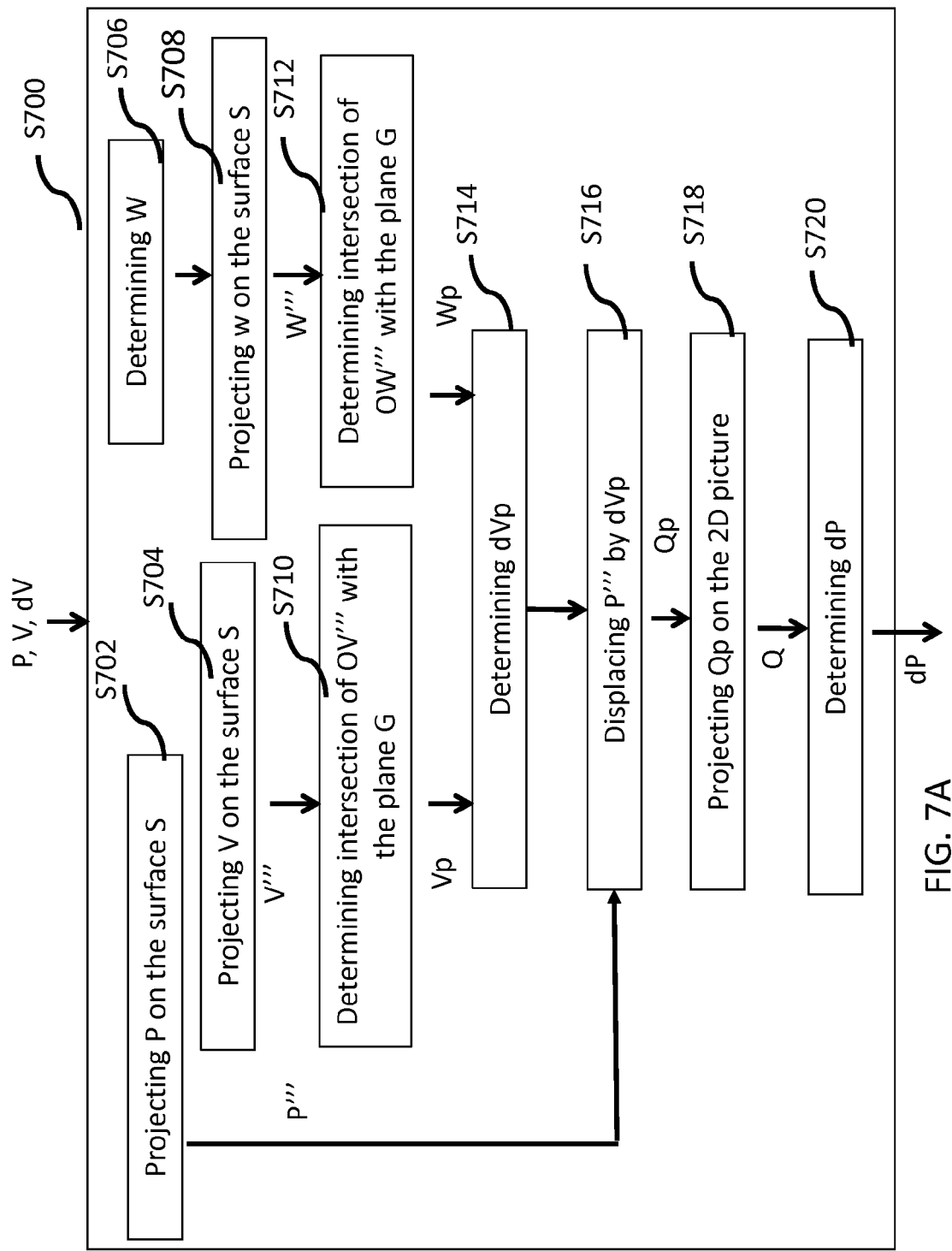
Figure 8A:
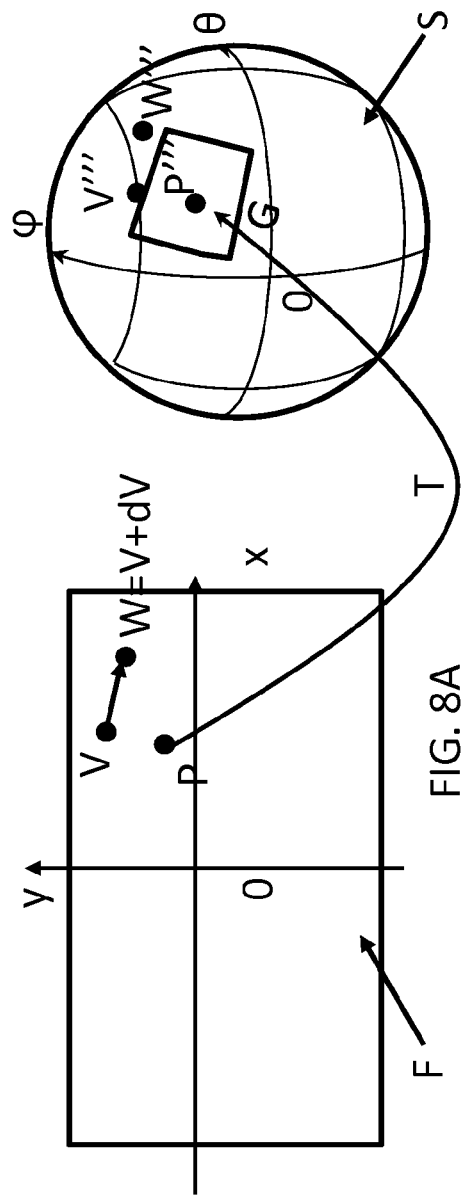
Figure 8B:
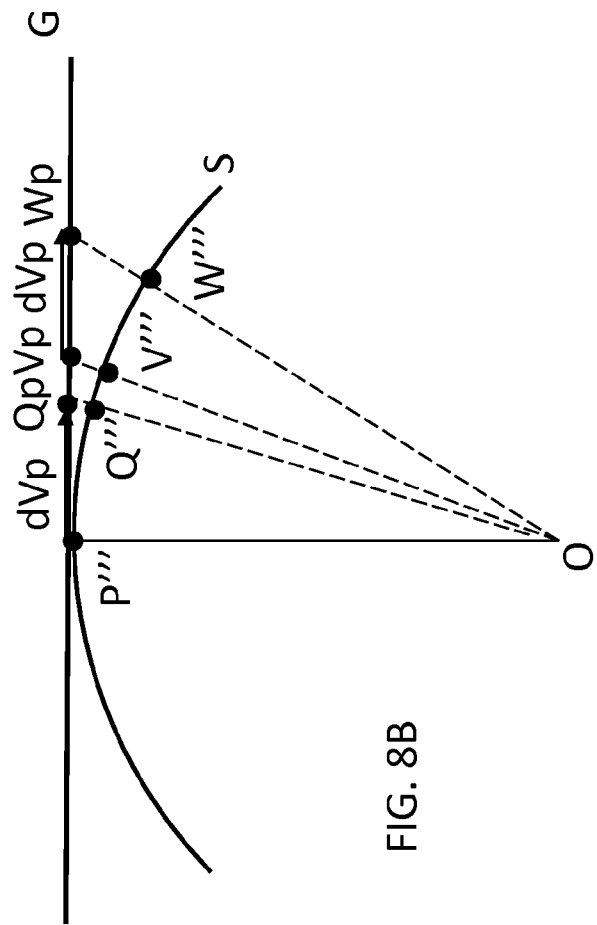
Figure 8C:
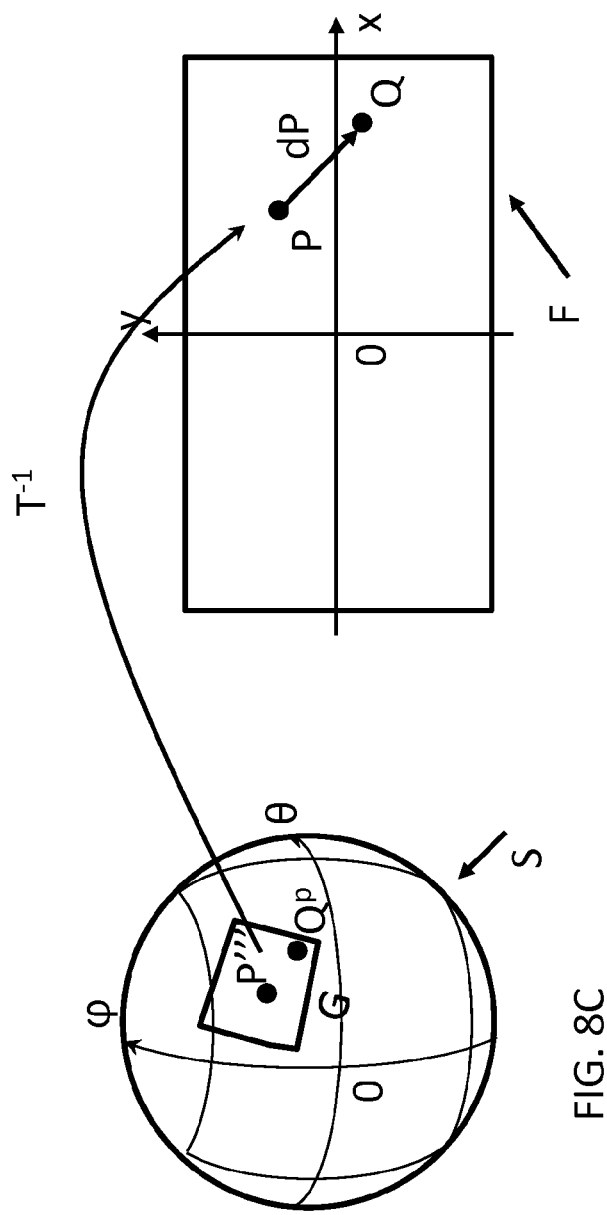
Figure 12:
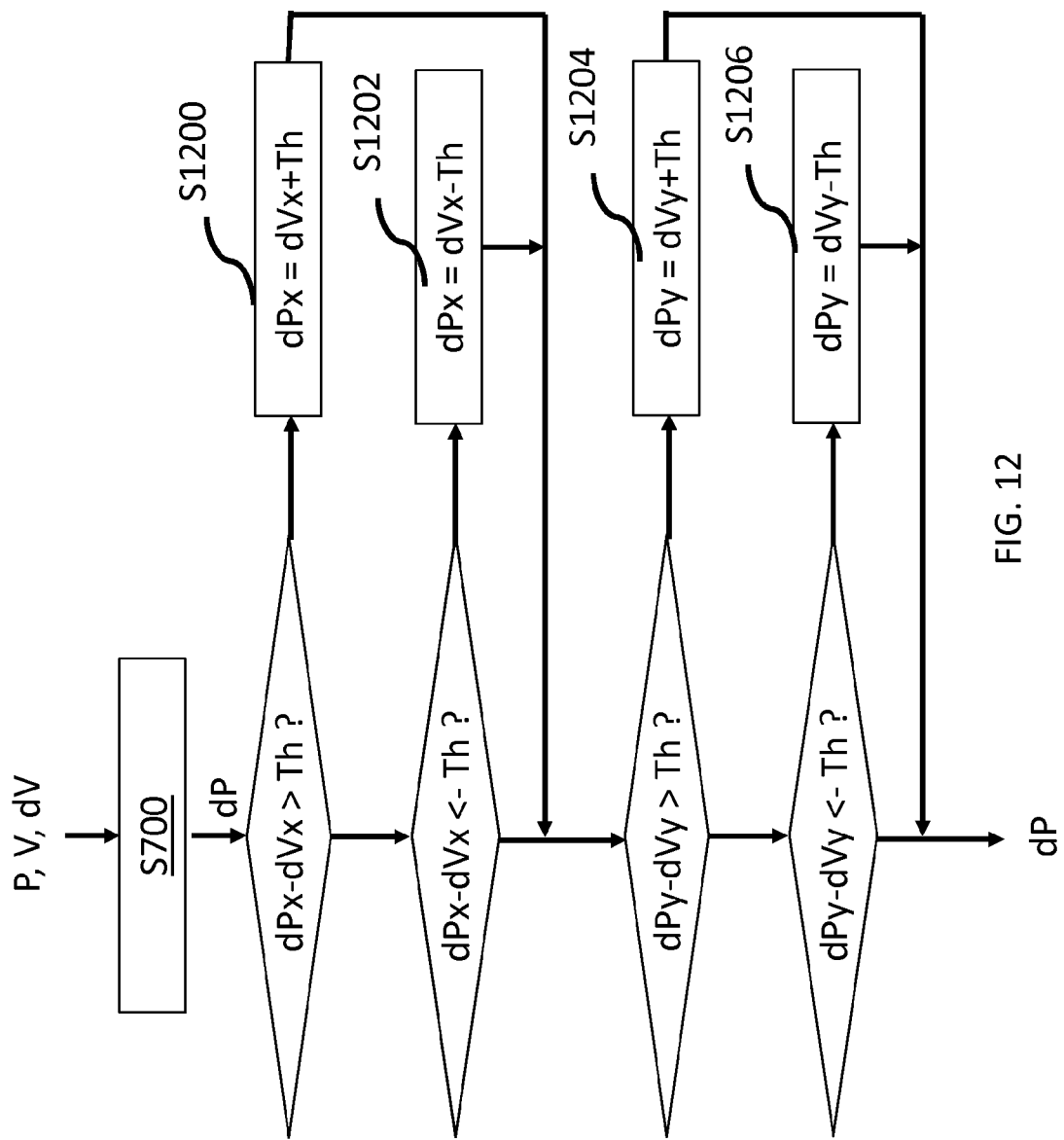
Figure 13:
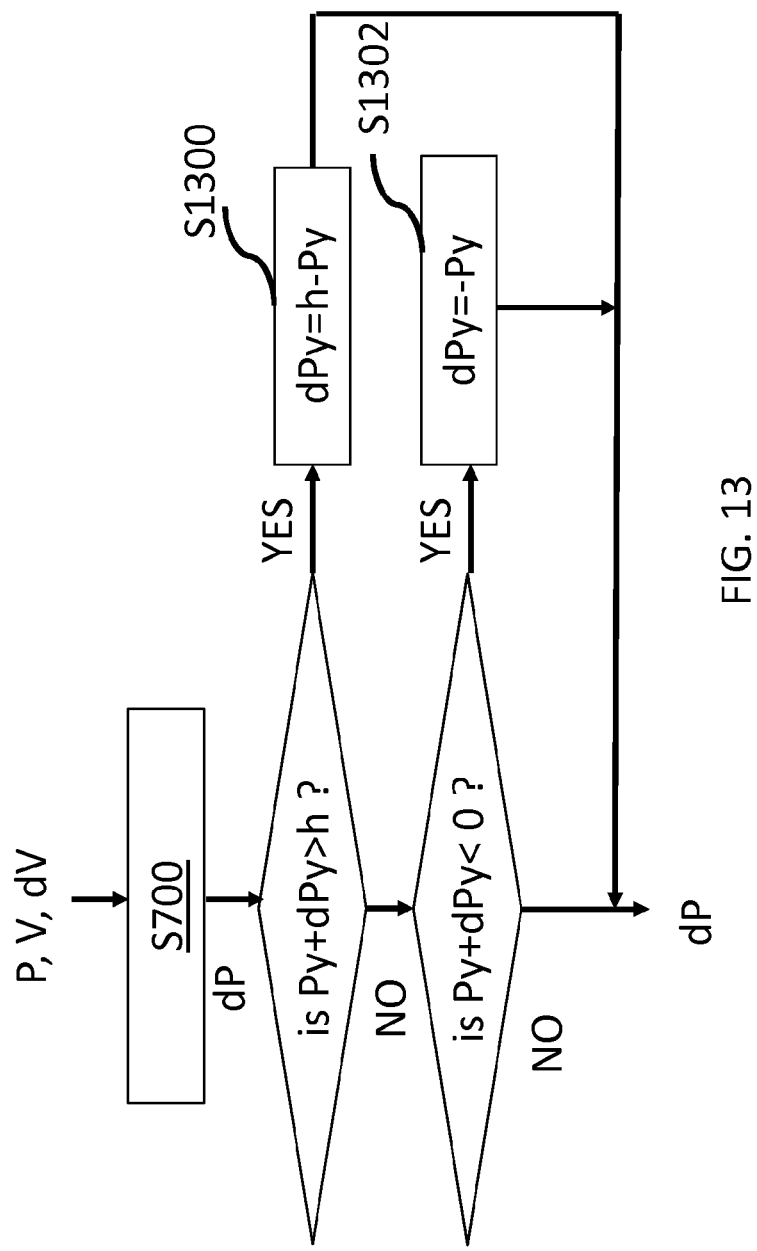
Figure 14A:
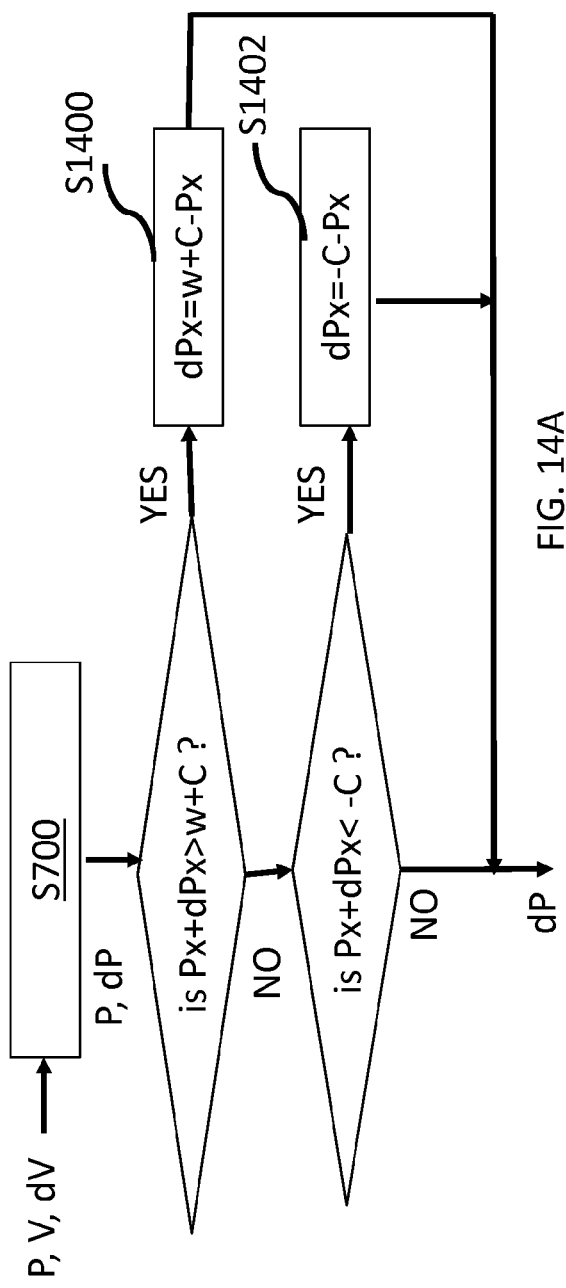
Figure 14B:
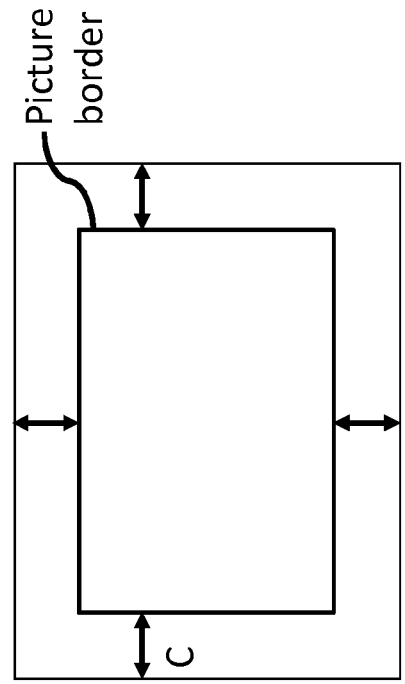
Figure 15:
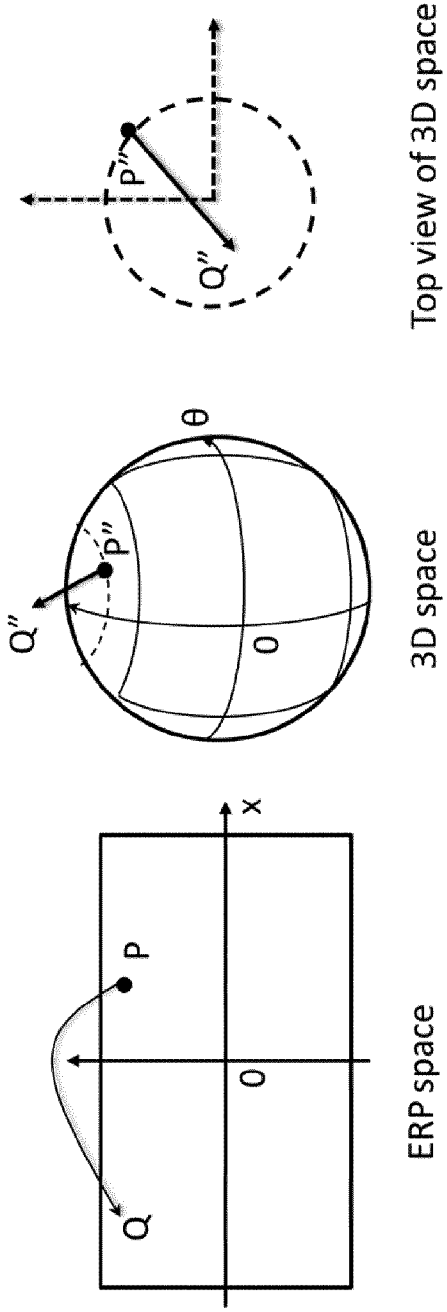
Figure 16:
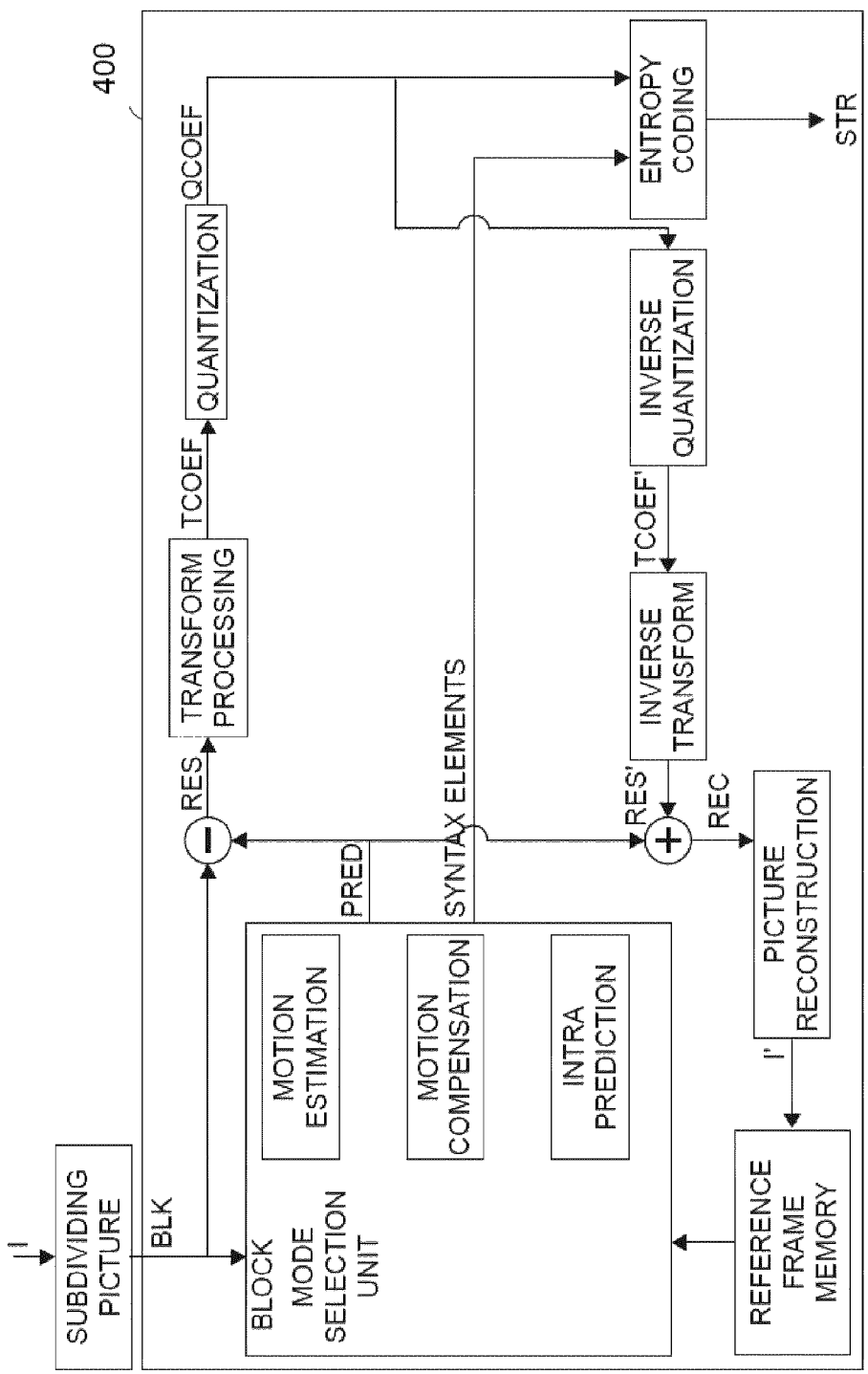
Figure 17:
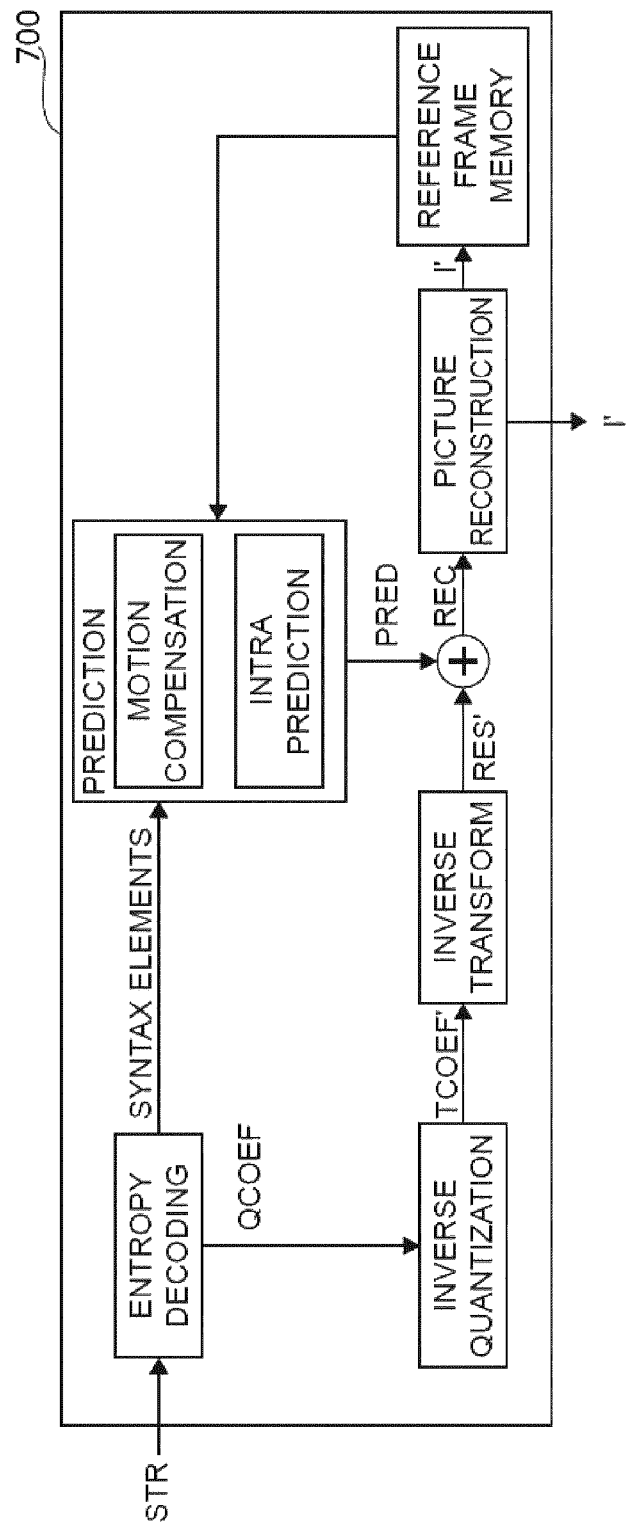
Figure 18:
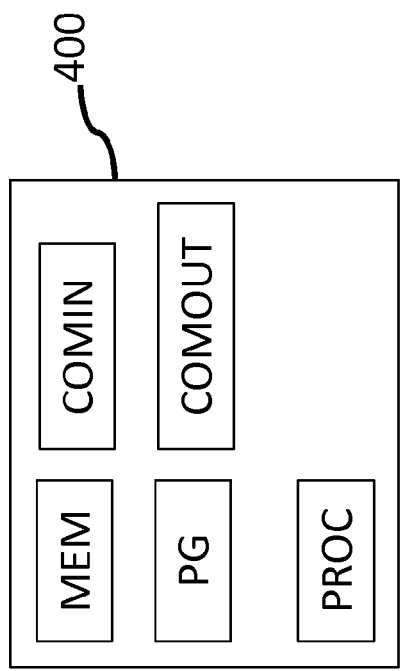
Figure 19:
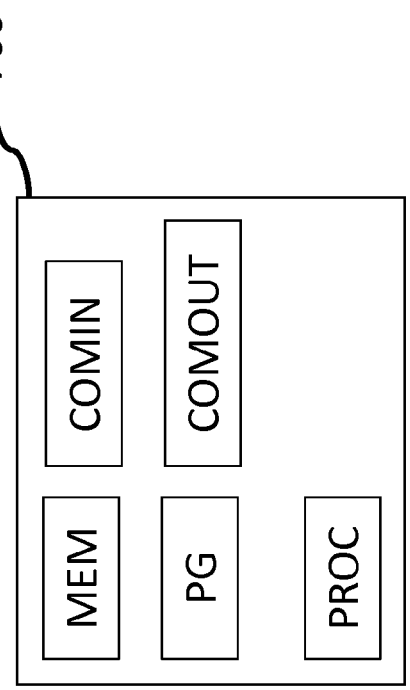
Figure 20:
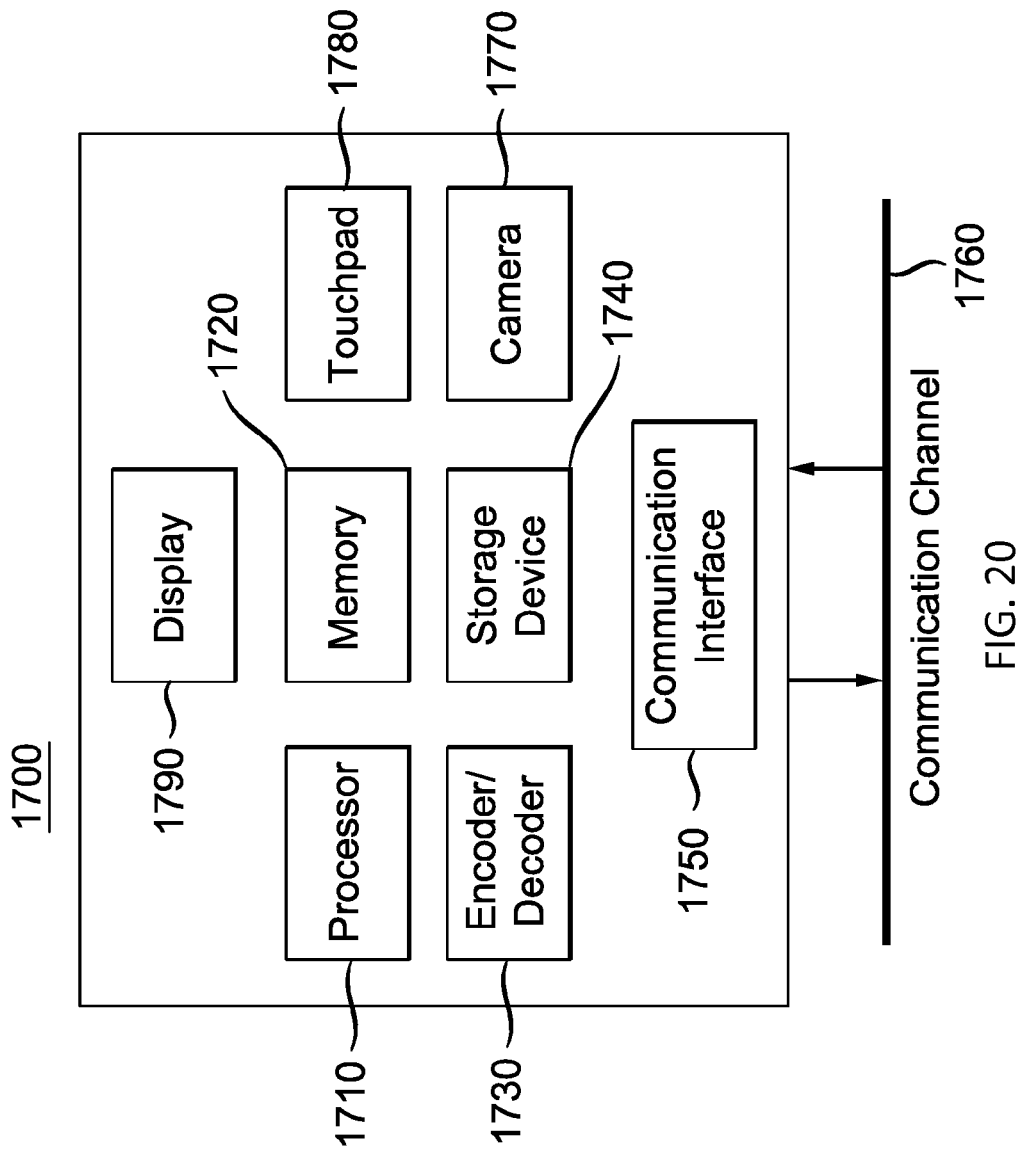
Figure 24:
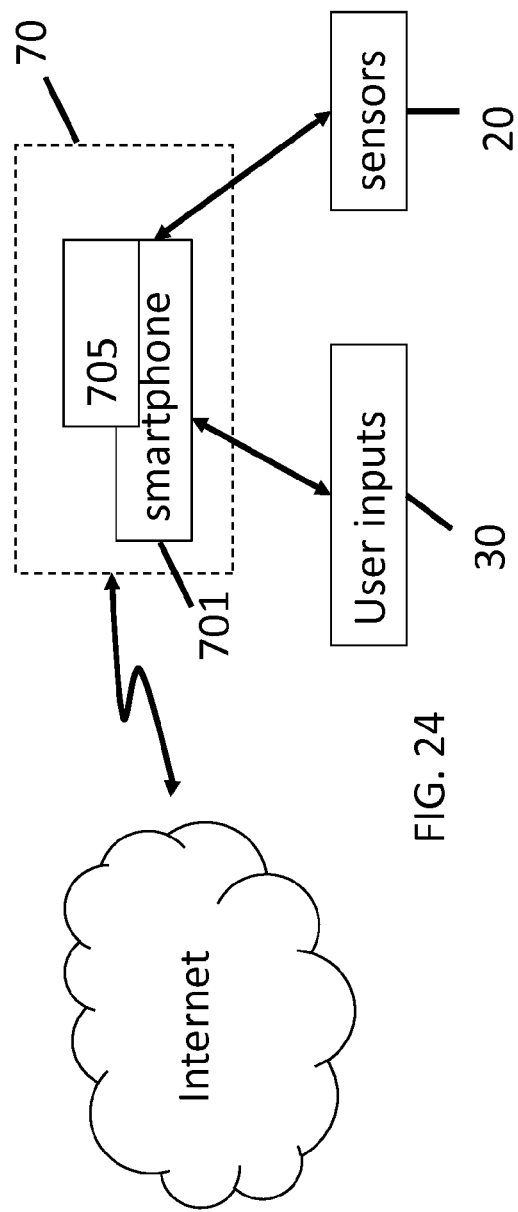
Figure 25:
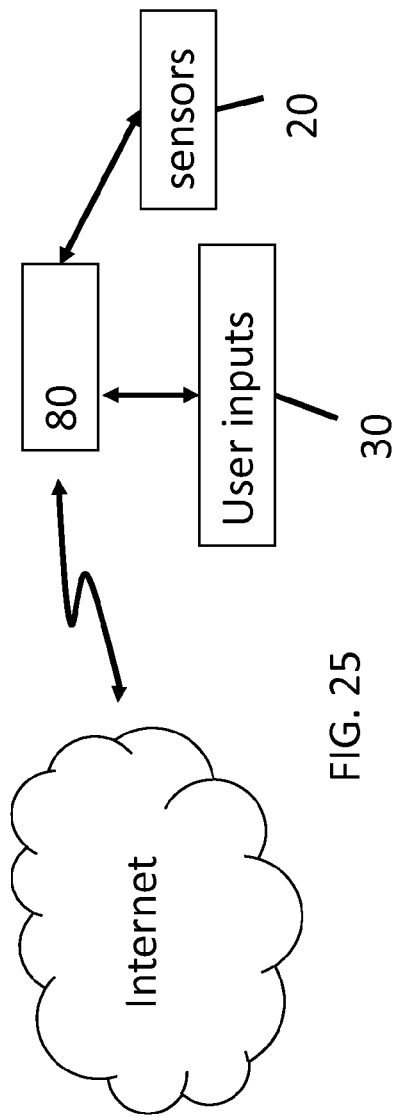
Figure 26:
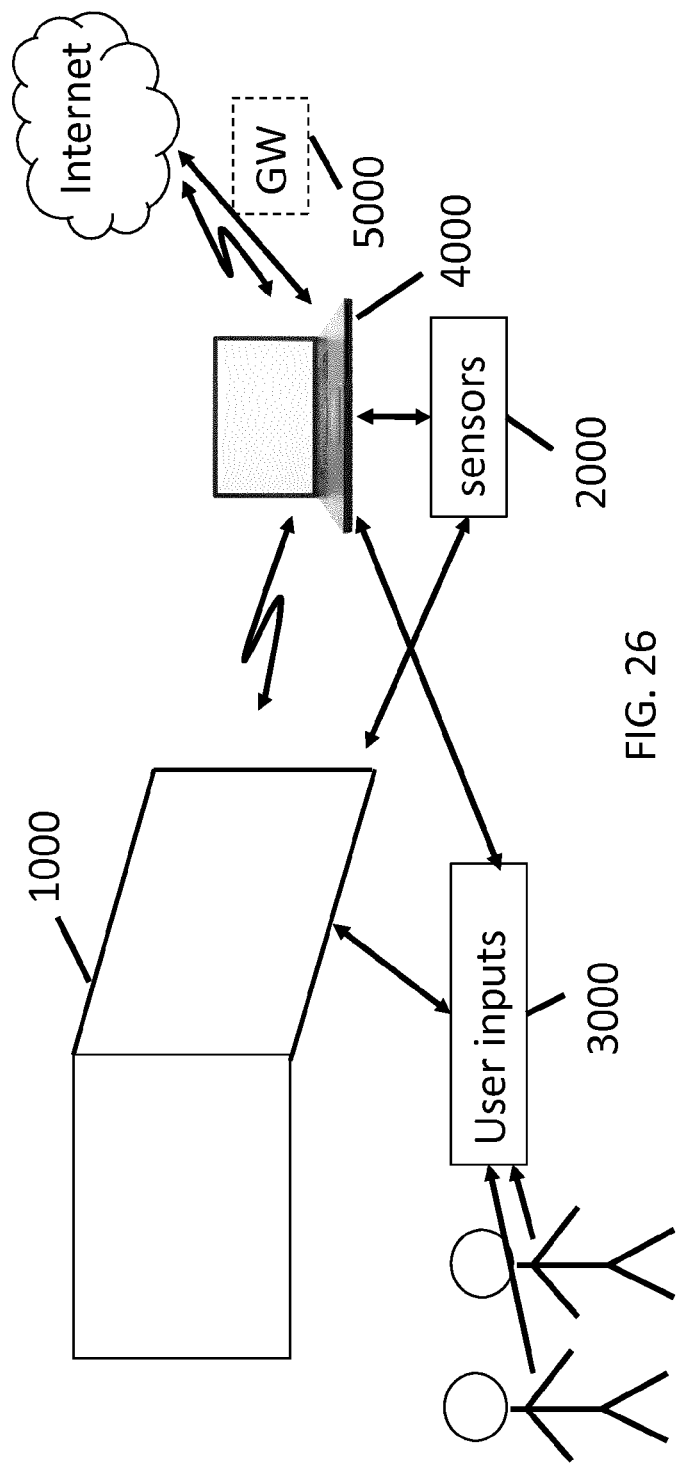
Figure 27:
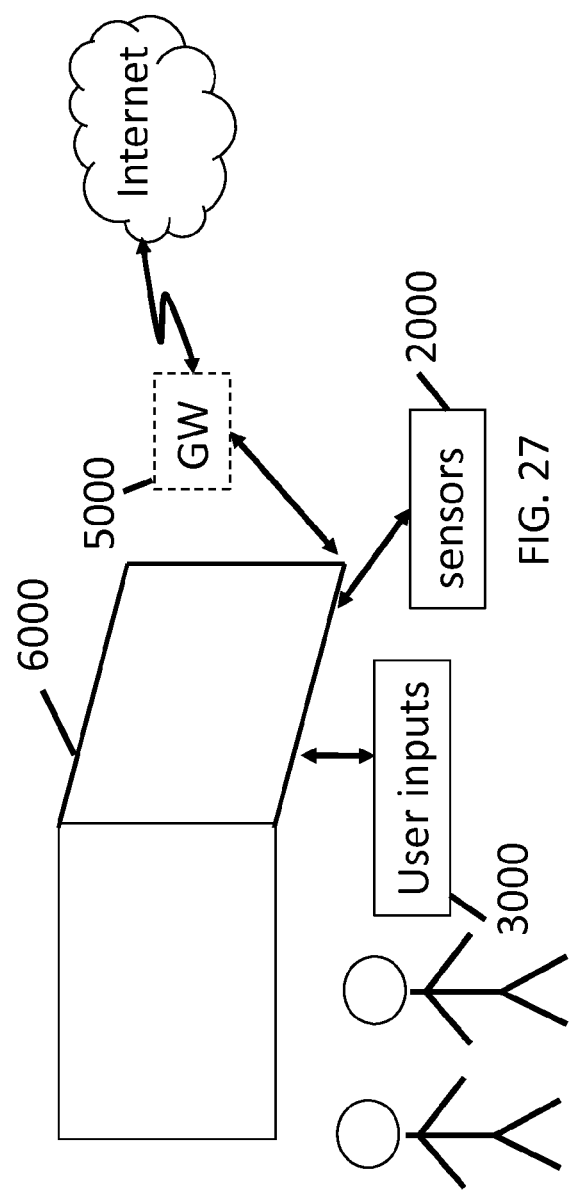
Figure 28:
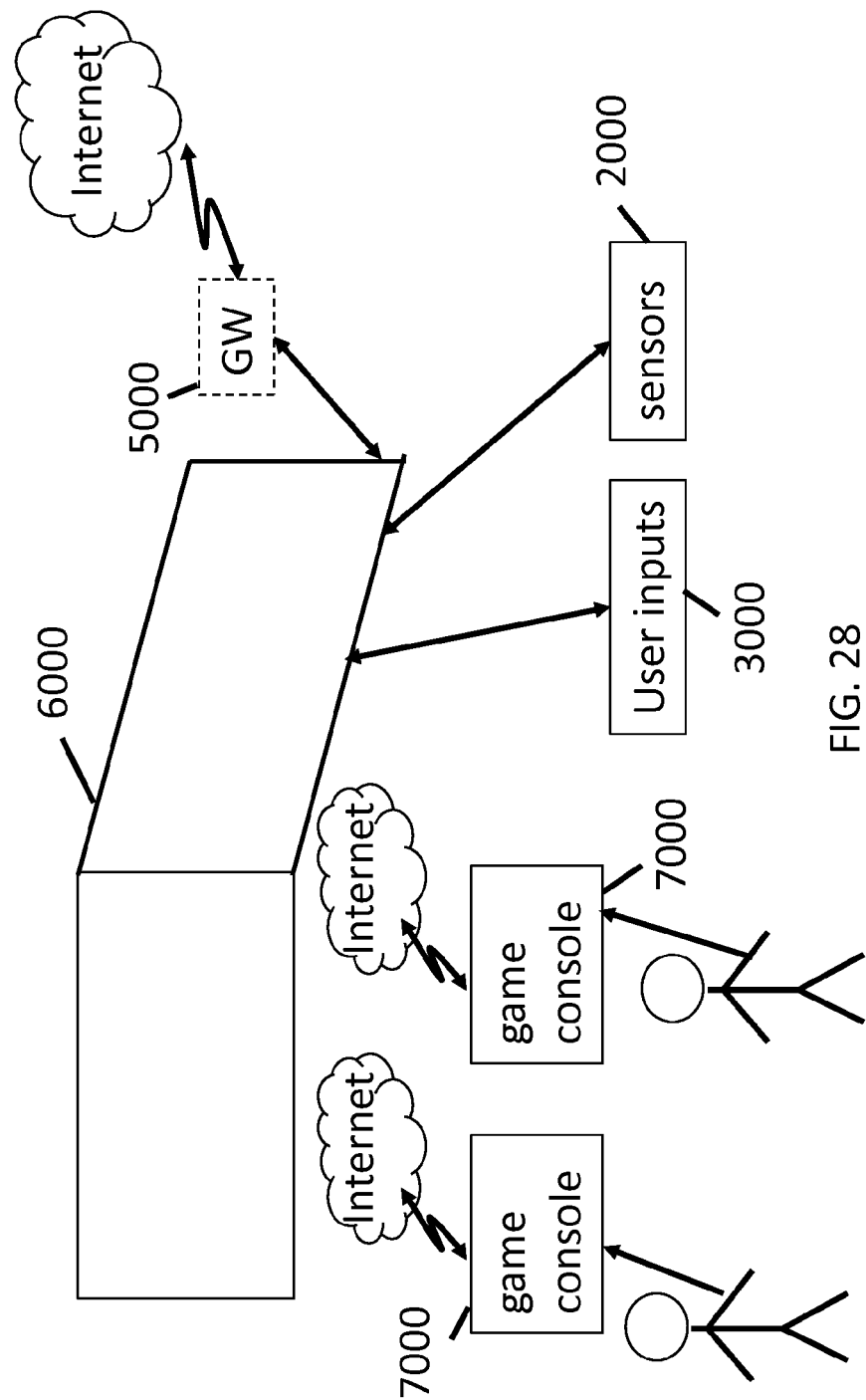
Figure 29:
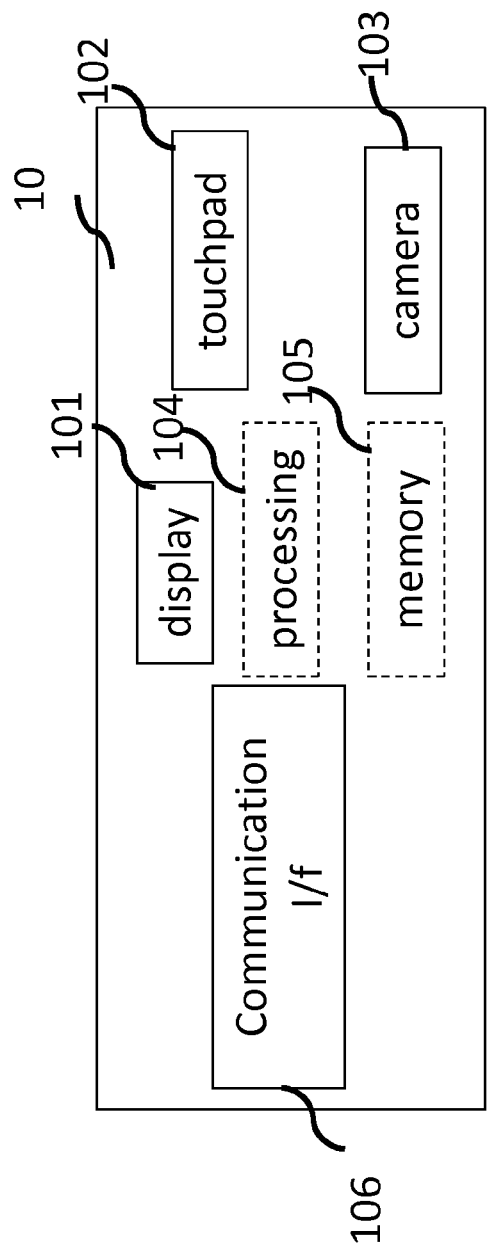
Figure 30:
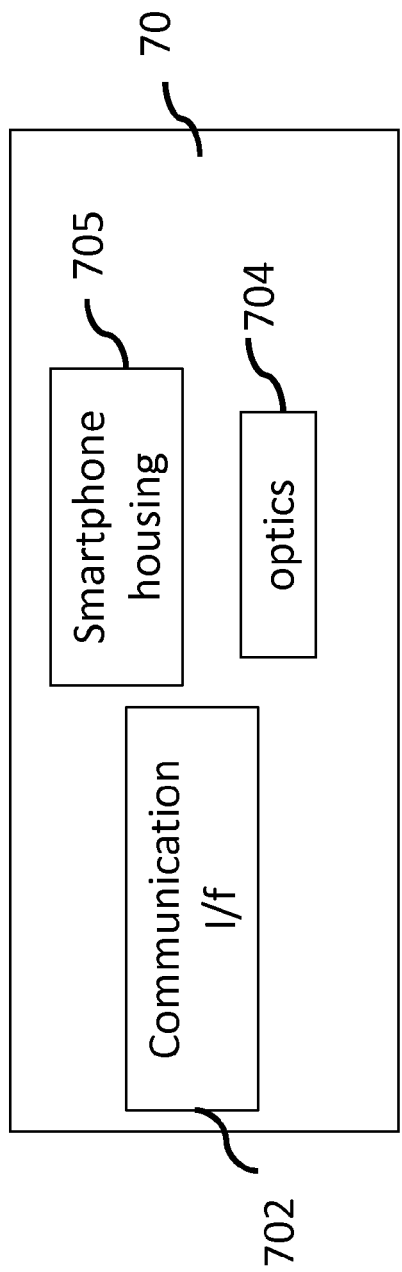
Figure 31:
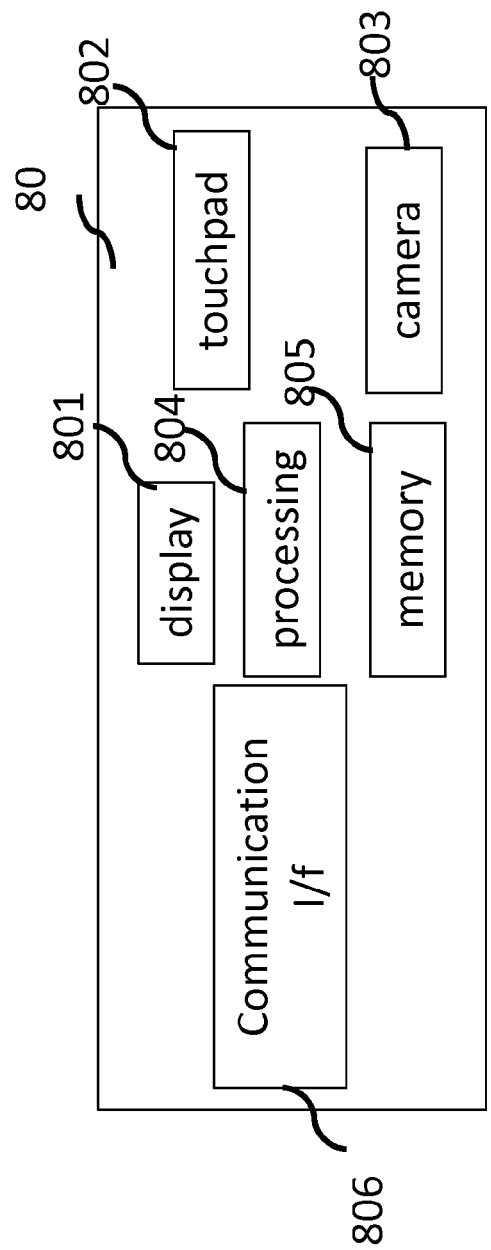

FIG. 1 illustrates an exemplary system for encoding and decoding omnidirectional videos, according to a specific and non-limiting embodiment, FIG. 2 illustrates an example of projection from a spherical surface S onto a rectangular picture F, FIG. 3A illustrates an example of projection from a cubic surface S onto six pictures, FIG. 3B illustrates a layout of the six faces of a cube projected on a 2D picture, FIG. 4A illustrates a moving object in a projected picture F of a 3D surface representing an omnidirectional video, FIG. 4B illustrates corresponding motion vectors in a block partitioning of the projected picture, FIG. 5A illustrates a flowchart of a method for encoding an omnidirectional video into a bitstream according to a specific and non-limiting embodiment, FIG. 5B illustrates a flowchart of a method for decoding a bitstream representative of a coded omnidirectional video, according to a specific and non-limiting embodiment, FIG. 6A illustrates a block BLK and one of its neighbor blocks with their associated motion vectors, FIG. 6B illustrates a block BLK and several of its sub-blocks with their associated motion vectors, FIGS. 7A and 7B illustrate flowcharts of a method for transforming a motion vector dV associated with a block of a 2D picture F into a motion vector dP associated with another block according to specific and non-limiting embodiments, FIG. 8A illustrates a projection from the frame to a sphere used in the method illustrated on FIG. 7A, FIG. 8B illustrates the sphere and a plane G tangent to the sphere, FIG. 8C illustrates a projection from the sphere to the frame used in the exemplary method illustrated on FIG. 7A, FIGS. 9-13 and 14A illustrate flowcharts of a method for transforming a motion vector dV associated with a block of a 2D picture F into a motion vector dP associated with another block according to a specific and non-limiting embodiment, FIG. 14B illustrate an extended picture area;

FIG. 15 illustrates the phenomenon of pole crossing,

FIG. 16 illustrates a block diagram for an exemplary encoder for coding an omnidirectional video into a bitstream according to a specific and non-limiting embodiment, FIG. 17 illustrates block diagrams of an exemplary decoder for decoding a current block of a 2D picture representative of a picture of an omnidirectional video, from a bitstream according to a specific and non-limiting embodiment, FIG. 18 illustrates an exemplary apparatus for encoding an omnidirectional video into a bitstream according to one embodiment, FIG. 19 illustrates an exemplary apparatus for decoding a bitstream representative of an omnidirectional video according to one embodiment, FIG. 20 illustrates a block diagram of an exemplary system in which various aspects of the embodiments may be implemented, FIGS. 21-25 illustrate a system configured to decode, process and render immersive videos according to various embodiments, FIGS. 26-28 represents a system with an immersive wall configured to decode, process and render immersive videos according to various embodiments, and FIGS. 29-31 represent immersive video rendering devices according to various embodiments.

5. DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

Various embodiments are described with respect to the HEVC standard. However, the embodiments are not limited to HEVC, and can be applied to other standards, recommendations, and extensions thereof, including for example HEVC or HEVC extensions like Format Range (RExt), Scalability (SHVC), Multi-View (MV-HEVC) Extensions and H.266. The various embodiments are described with respect to the encoding/decoding of a block. They may be applied to encode/decode a whole picture or a whole sequence of pictures.

Various methods are described above, and each of the methods comprises one or more steps or actions for achieving the described method. Unless a specific order of steps or actions is required for proper operation of the method, the order and/or use of specific steps and/or actions may be modified or combined.

A large field of view content may be, among others, a three-dimension computer graphic imagery scene (3D CGI scene), a point cloud or an immersive video. Many terms might be used to design such immersive videos such as for example virtual Reality (VR), 360, panoramic, 4π, steradians, immersive, omnidirectional, large field of view.

An immersive video typically refers to a video encoded on a rectangular frame that is a two-dimension array of pixels (i.e., element of color information) like a "regular" video. In many implementations, the following processes may be performed. To be rendered, the frame is, first, mapped on the inner face of a convex volume, also called mapping surface (e.g., a sphere, a cube, a pyramid), and, second, a part of this volume is captured by a virtual camera. Images captured by the virtual camera are rendered on the screen of the immersive display device. A stereoscopic video is encoded on one or two rectangular frames, projected on two mapping surfaces which are combined to be captured by two virtual cameras according to the characteristics of the device.

Pixels may be encoded according to a mapping function in the frame. The mapping function may depend on the mapping surface. For a same mapping surface, several mapping functions are possible. For example, the faces of a cube may be structured according to different layouts within the frame surface. A sphere may be mapped according to an equirectangular projection or to a gnomonic projection for example. The organization of pixels resulting from the selected projection function modifies or breaks lines continuities, orthonormal local frame, pixel densities and introduces periodicity in time and space. These are typical features that are used to encode and decode videos. Existing encoding and decoding methods usually do not take specificities of immersive videos into account. Indeed, as immersive videos can be 360° videos, a panning, for example, introduces motion and discontinuities that require a large amount of data to be encoded while the content of the scene does not change. Taking immersive videos specificities into account while encoding and decoding video frames would bring valuable advantages to the encoding or decoding methods.

FIG. 1 illustrates a general overview of an encoding and decoding system according to a specific and non-limiting embodiment. The system of FIG. 1 is a functional system. A pre-processing module 110 may prepare the content for encoding by the encoding device 120. The pre-processing module 110 may perform multi-image acquisition, merging of the acquired multiple images in a common space (typically a 3D sphere if we encode the directions), and mapping of the 3D sphere into a 2D frame using, for example, but not limited to, an equirectangular mapping or a cube mapping. The pre-processing module 110 may also accept an omnidirectional video in a particular format (for example, equirectangular) as input, and pre-processes the video to change the mapping into a format more suitable for encoding. Depending on the acquired video data representation, the pre-processing module 110 may perform a mapping space change.

The encoding device 120 and the encoding method will be described with respect to other figures of the specification. After being encoded, the data, which may encode immersive video data or 3D CGI encoded data for instance, are sent to a network interface 130, which can be typically implemented in any network interface, for instance present in a gateway. The data are then transmitted through a communication network, such as Internet but any other network can be foreseen. Then the data are received via network interface 140. Network interface 140 can be implemented in a gateway, in a television, in a set-top box, in a head mounted display device, in an immersive (projective) wall or in any immersive video rendering device.

After reception, the data are sent to a decoding device 150. Decoding function is one of the processing functions described in the following FIGS. 21 to 31. Decoded data are then processed by a player 160. Player 160 prepares the data for the rendering device 170 and may receive external data from sensors or users input data. More precisely, the player 160 prepares the part of the video content that is going to be displayed by the rendering device 170. The decoding device 150 and the player 160 may be integrated in a single device (e.g., a smartphone, a game console, a STB, a tablet, a computer, etc.). In other embodiments, the player 160 may be integrated in the rendering device 170.

Several types of systems may be envisioned to perform the decoding, playing and rendering functions of an immersive display device, for example when rendering an immersive video.

A first system, for processing augmented reality, virtual reality, or augmented virtuality content is illustrated in FIGS. 21 to 25. Such a system comprises processing functions, an immersive video rendering device which may be a head mounted display (HMD), a tablet or a smartphone for example and may comprise sensors. The immersive video rendering device may also comprise additional interface modules between the display device and the processing functions. The processing functions can be performed by one or several devices. They can be integrated into the immersive video rendering device or they can be integrated into one or several processing devices. The processing device comprises one or several processors and a communication interface with the immersive video rendering device, such as a wireless or wired communication interface.

The processing device can also comprise a second communication interface with a wide access network such as internet and access content located on a cloud, directly or through a network device such as a home or a local gateway. The processing device can also access a local storage through a third interface such as a local access network interface of Ethernet type. In an embodiment, the processing device may be a computer system having one or several processing units. In another embodiment, it may be a smartphone which can be connected through wired or wireless links to the immersive video rendering device or which can be inserted in a housing in the immersive video rendering device and communicating with it through a connector or wirelessly as well. Communication interfaces of the processing device are wireline interfaces (for example a bus interface, a wide area network interface, a local area network interface) or wireless interfaces (such as a IEEE 802.11 interface or a Bluetooth® interface).

When the processing functions are performed by the immersive video rendering device, the immersive video rendering device can be provided with an interface to a network directly or through a gateway to receive and/or transmit content.

In another embodiment, the system comprises an auxiliary device which communicates with the immersive video rendering device and with the processing device. In such an embodiment, this auxiliary device can contain at least one of the processing functions.

The immersive video rendering device may comprise one or several displays. The device may employ optics such as lenses in front of each of its display. The display can also be a part of the immersive display device like in the case of smartphones or tablets. In another embodiment, displays and optics may be embedded in a helmet, in glasses, or in a visor that a user can wear. The immersive video rendering device may also integrate several sensors, as described later on. The immersive video rendering device can also comprise several interfaces or connectors. It might comprise one or several wireless modules in order to communicate with sensors, processing functions, handheld or other body parts related devices or sensors.

The immersive video rendering device can also comprise processing functions executed by one or several processors and configured to decode content or to process content. By processing content here, it is understood all functions to prepare a content that can be displayed. This may comprise, for instance, decoding a content, merging content before displaying it and modifying the content to fit with the display device.

One function of an immersive content rendering device is to control a virtual camera which captures at least a part of the content structured as a virtual volume. The system may comprise pose tracking sensors which totally or partially track the user's pose, for example, the pose of the user's head, in order to process the pose of the virtual camera. Some positioning sensors may track the displacement of the user. The system may also comprise other sensors related to environment for example to measure lighting, temperature or sound conditions. Such sensors may also be related to the users' bodies, for instance, to measure sweating or heart rate. Information acquired through these sensors may be used to process the content. The system may also comprise user input devices (e.g., a mouse, a keyboard, a remote control, a joystick). Information from user input devices may be used to process the content, manage user interfaces or to control the pose of the virtual camera. Sensors and user input devices communicate with the processing device and/or with the immersive rendering device through wired or wireless communication interfaces.

Using FIGS. 21 to 25, several embodiments are described of this first type of system for displaying augmented reality, virtual reality, augmented virtuality or any content from augmented reality to virtual reality.

Figure 21:
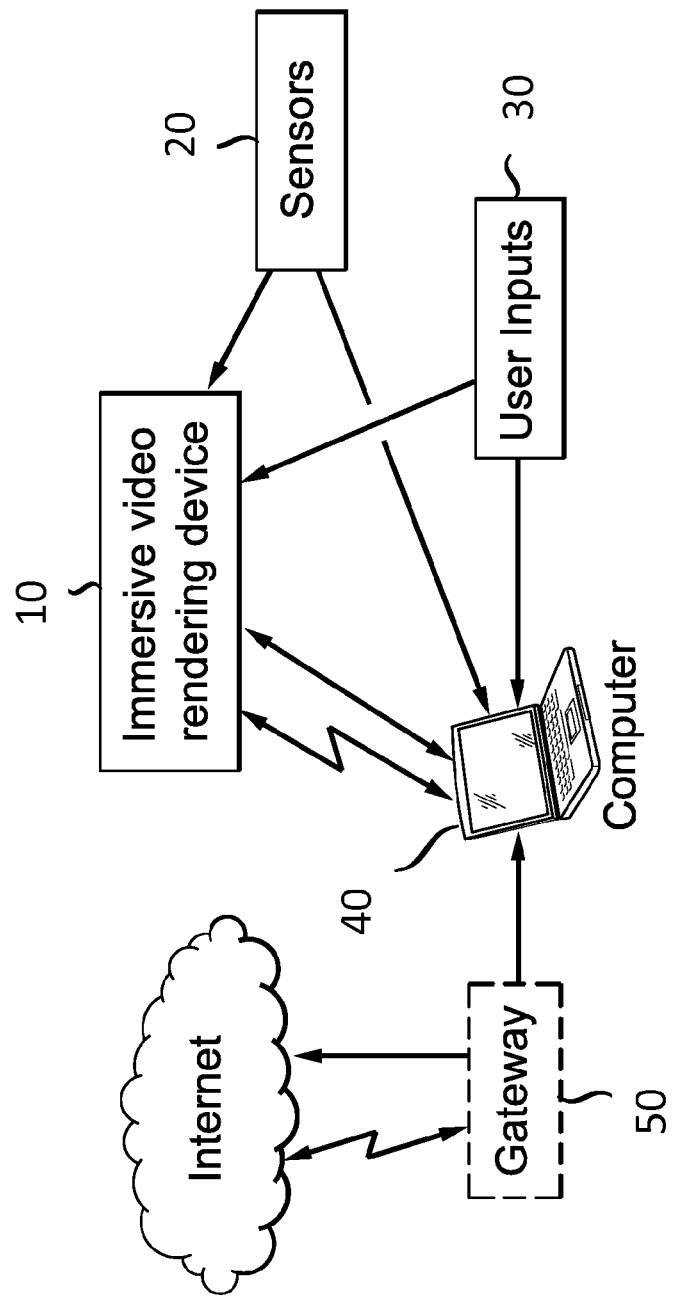

FIG. 21 illustrates a particular embodiment of a system configured to decode, process and render immersive videos. The system comprises an immersive video rendering device 10, sensors 20, user inputs devices 30, a computer 40 and a gateway 50 (optional). The immersive video rendering device 10, illustrated in FIG. 29, comprises a display 101. The display is, for example of OLED or LCD type. The immersive video rendering device 10 is, for instance a HMD, a tablet or a smartphone. The device 10 may comprise a touch surface 102 (e.g., a touchpad or a tactile screen), a camera 103, a memory 105 in connection with at least one processor 104 and at least one communication interface 106. The at least one processor 104 processes the signals received from the sensors 20.

Some of the measurements from sensors are used to compute the pose of the device and to control the virtual camera. Sensors used for pose estimation are, for instance, gyroscopes, accelerometers or compasses. More complex systems, for example using a rig of cameras may also be used. In this case, the at least one processor performs image processing to estimate the pose of the device 10. Some other measurements are used to process the content according to environment conditions or user's reactions. Sensors used for observing environment and users are, for instance, microphones, light sensor or contact sensors. More complex systems may also be used like, for example, a video camera tracking user's eyes. In this case the at least one processor performs image processing to operate the expected measurement. Data from sensors 20 and user input devices 30 can also be transmitted to the computer 40 which will process the data according to the input of these sensors.

Memory 105 includes parameters and code program instructions for the processor 104. Memory 105 can also comprise parameters received from the sensors 20 and user input devices 30. Communication interface 106 enables the immersive video rendering device to communicate with the computer 40. The communication interface 106 of the processing device may be wireline interfaces (for example a bus interface, a wide area network interface, a local area network interface) or wireless interfaces (such as a IEEE 802.11 interface or a Bluetooth® interface).

Computer 40 sends data and optionally control commands to the immersive video rendering device 10. The computer 40 is in charge of processing the data, i.e., prepare them for display by the immersive video rendering device 10. Processing can be done exclusively by the computer 40 or part of the processing can be done by the computer and part by the immersive video rendering device 10. The computer 40 is connected to internet, either directly or through a gateway or network interface 50. The computer 40 receives data representative of an immersive video from the internet, processes these data (e.g., decodes them and possibly prepares the part of the video content that is going to be displayed by the immersive video rendering device 10) and sends the processed data to the immersive video rendering device 10 for display. In another embodiment, the system may also comprise local storage (not represented) where the data representative of an immersive video are stored, said local storage can be on the computer 40 or on a local server accessible through a local area network for instance (not represented).

FIG. 22 represents a second embodiment. In this embodiment, a STB 90 is connected to a network such as internet directly (i.e., the STB 90 comprises a network interface) or via a gateway 50. The STB 90 is connected through a wireless interface or through a wired interface to rendering devices such as a television set 100 or an immersive video rendering device 200. In addition to classic functions of a STB, STB 90 comprises processing functions to process video content for rendering on the television 100 or on any immersive video rendering device 200. These processing functions are the same as the ones that are described for computer 40 and are not described again here. Sensors 20 and user input devices 30 are also of the same type as the ones described earlier with regards to FIG. 21. The STB 90 obtains the data representative of the immersive video from the internet. In another embodiment, the STB 90 obtains the data representative of the immersive video from a local storage (not represented) where the data representative of the immersive video are stored.

FIG. 23 represents a third embodiment related to the one represented in FIG. 21. The game console 60 processes the content data. Game console 60 sends data and optionally control commands to the immersive video rendering device 10. The game console 60 is configured to process data representative of an immersive video and to send the processed data to the immersive video rendering device 10 for display. Processing can be done exclusively by the game console 60 or part of the processing can be done by the immersive video rendering device 10.

The game console 60 is connected to internet, either directly or through a gateway or network interface 50. The game console 60 obtains the data representative of the immersive video from the internet. In another embodiment, the game console 60 obtains the data representative of the immersive video from a local storage (not represented) where the data representative of the immersive video are stored, said local storage can be on the game console 60 or on a local server accessible through a local area network for instance (not represented).

The game console 60 receives data representative of an immersive video from the internet, processes these data (e.g., decodes them and possibly prepares the part of the video that is going to be displayed) and sends the processed data to the immersive video rendering device 10 for display. The game console 60 may receive data from sensors 20 and user input devices 30 and may use them to process the data representative of an immersive video obtained from the internet or from the from the local storage.

FIG. 24 represents a fourth embodiment of said first type of system where the immersive video rendering device 70 is formed by a smartphone 701 inserted in a housing 705. The smartphone 701 may be connected to internet and thus may obtain data representative of an immersive video from the internet. In another embodiment, the smartphone 701 obtains data representative of an immersive video from a local storage (not represented) where the data representative of an immersive video are stored, said local storage can be on the smartphone 701 or on a local server accessible through a local area network for instance (not represented).

Immersive video rendering device 70 is described with reference to FIG. 30 which gives a preferred embodiment of immersive video rendering device 70. It optionally comprises at least one network interface 702 and the housing 705 for the smartphone 701. The smartphone 701 comprises all functions of a smartphone and a display. The display of the smartphone is used as the immersive video rendering device 70 display. Therefore, no display other than the one of the smartphone 701 is included. However, optics 704, such as lenses, are included for seeing the data on the smartphone display. The smartphone 701 is configured to process (e.g., decode and prepare for display) data representative of an immersive video possibly according to data received from the sensors 20 and from user input devices 30. Some of the measurements from sensors are used to compute the pose of the device and to control the virtual camera. Sensors used for pose estimation are, for instance, gyroscopes, accelerometers or compasses. More complex systems, for example using a rig of cameras may also be used. In this case, the at least one processor performs image processing to estimate the pose of the device 10. Some other measurements are used to process the content according to environment conditions or user's reactions. Sensors used for observing environment and users are, for instance, microphones, light sensor or contact sensors. More complex systems may also be used like, for example, a video camera tracking user's eyes. In this case the at least one processor performs image processing to operate the expected measurement.

FIG. 25 represents a fifth embodiment of said first type of system in which the immersive video rendering device 80 comprises all functionalities for processing and displaying the data content. The system comprises an immersive video rendering device 80, sensors 20 and user input devices 30. The immersive video rendering device 80 is configured to process (e.g., decode and prepare for display) data representative of an immersive video possibly according to data received from the sensors 20 and from the user input devices 30. The immersive video rendering device 80 may be connected to internet and thus may obtain data representative of an immersive video from the internet. In another embodiment, the immersive video rendering device 80 obtains data representative of an immersive video from a local storage (not represented) where the data representative of an immersive video are stored, said local storage can be on the rendering device 80 or on a local server accessible through a local area network for instance (not represented).

The immersive video rendering device 80 is illustrated in FIG. 31. The immersive video rendering device comprises a display 801. The display can be for example of OLED or LCD type. The device 80 may comprise a touch surface (optional) 802 (e.g., a touchpad or a tactile screen), a camera (optional) 803, a memory 805 in connection with at least one processor 804 and at least one communication interface 806. Memory 805 comprises parameters and code program instructions for the processor 804. Memory 805 can also comprise parameters received from the sensors 20 and user input devices 30. Memory can also be large enough to store the data representative of the immersive video content. For this several types of memories can exist and memory 805 can be a single memory or can be several types of storage (SD card, hard disk, volatile or non-volatile memory . . . ) Communication interface 806 enables the immersive video rendering device to communicate with internet network. The processor 804 processes data representative of the video in order to display them of display 801. The camera 803 captures images of the environment for an image processing step. Data are extracted from this step in order to control the immersive video rendering device.

A second system, for processing augmented reality, virtual reality, or augmented virtuality content is illustrated in FIGS. 26 to 28. Such a system comprises an immersive wall.

FIG. 26 represents a system of the second type. It comprises a display 1000 which is an immersive (projective) wall which receives data from a computer 4000. The computer 4000 may receive immersive video data from the internet. The computer 4000 is usually connected to internet, either directly or through a gateway 5000 or network interface. In another embodiment, the immersive video data are obtained by the computer 4000 from a local storage (not represented) where the data representative of an immersive video are stored, said local storage can be in the computer 4000 or in a local server accessible through a local area network for instance (not represented).

This system may also comprise sensors 2000 and user input devices 3000. The immersive wall 1000 can be of OLED or LCD type. It can be equipped with one or several cameras. The immersive wall 1000 may process data received from the sensor 2000 (or the plurality of sensors 2000). The data received from the sensors 2000 may be related to lighting conditions, temperature, environment of the user, e.g., position of objects.

The immersive wall 1000 may also process data received from the user inputs devices 3000. The user input devices 3000 send data such as haptic signals in order to give feedback on the user emotions. Examples of user input devices 3000 are handheld devices such as smartphones, remote controls, and devices with gyroscope functions.

Sensors 2000 and user input devices 3000 data may also be transmitted to the computer 4000. The computer 4000 may process the video data (e.g., decoding them and preparing them for display) according to the data received from these sensors/user input devices. The sensors signals can be received through a communication interface of the immersive wall. This communication interface can be of Bluetooth type, of WIFI type or any other type of connection, preferentially wireless but can also be a wired connection.

Computer 4000 sends the processed data and optionally control commands to the immersive wall 1000. The computer 4000 is configured to process the data, i.e., preparing them for display, to be displayed by the immersive wall 1000. Processing can be done exclusively by the computer 4000 or part of the processing can be done by the computer 4000 and part by the immersive wall 1000.

FIG. 27 represents another system of the second type. It comprises an immersive (projective) wall 6000 which is configured to process (e.g., decode and prepare data for display) and display the video content. It further comprises sensors 2000, user input devices 3000.

The immersive wall 6000 receives immersive video data from the internet through a gateway 5000 or directly from internet. In another embodiment, the immersive video data are obtained by the immersive wall 6000 from a local storage (not represented) where the data representative of an immersive video are stored, said local storage can be in the immersive wall 6000 or in a local server accessible through a local area network for instance (not represented).

This system may also comprise sensors 2000 and user input devices 3000. The immersive wall 6000 can be of OLED or LCD type. It can be equipped with one or several cameras. The immersive wall 6000 may process data received from the sensor 2000 (or the plurality of sensors 2000). The data received from the sensors 2000 may be related to lighting conditions, temperature, environment of the user, e.g., position of objects.

The immersive wall 6000 may also process data received from the user inputs devices 3000. The user input devices 3000 send data such as haptic signals in order to give feedback on the user emotions. Examples of user input devices 3000 are handheld devices such as smartphones, remote controls, and devices with gyroscope functions.

The immersive wall 6000 may process the video data (e.g., decoding them and preparing them for display) according to the data received from these sensors/user input devices. The sensors signals can be received through a communication interface of the immersive wall. This communication interface can be of Bluetooth type, of WIFI type or any other type of connection, preferentially wireless but can also be a wired connection. The immersive wall 6000 may comprise at least one communication interface to communicate with the sensors and with internet.

FIG. 28 illustrates a third embodiment where the immersive wall is used for gaming One or several gaming consoles 7000 are connected, preferably through a wireless interface to the immersive wall 6000. The immersive wall 6000 receives immersive video data from the internet through a gateway 5000 or directly from internet. In another embodiment, the immersive video data are obtained by the immersive wall 6000 from a local storage (not represented) where the data representative of an immersive video are stored, said local storage can be in the immersive wall 6000 or in a local server accessible through a local area network for instance (not represented).

Gaming console 7000 sends instructions and user input parameters to the immersive wall 6000. Immersive wall 6000 processes the immersive video content possibly according to input data received from sensors 2000 and user input devices 3000 and gaming consoles 7000 in order to prepare the content for display. The immersive wall 6000 may also comprise internal memory to store the content to be displayed.

In one embodiment, we consider that the omnidirectional video is represented in a format that enables the projection of the surrounding 3D surface S onto a standard rectangular frame F that is represented in a format suitable for a video codec. Various projections can be used to project 3D surfaces to 2D surfaces. For example, FIG. 2 shows that an exemplary sphere surface S is mapped to a 2D frame F using an equi-rectangular projection, and FIG. 3A shows that an exemplary cube surface is mapped to a 2D frame as shown in FIG. 3B using a cube mapping. Other mappings, such as pyramidal, icosahedral or octahedral mapping, can be used to map a 3D surface into a 2D frame.

The 2D frame F can then be encoded using existing video encoders, for example, encoders compliant with VP9, VP10, MPEG-2, H.264/AVC, or H.265/HEVC. The 2D frame F can also be encoded with an encoder adapted to the properties of omnidirectional videos, for example, using an adapted VP9, VP10, MPEG-2, H.264/AVC, or H.265/HEVC encoder. After encoding and decoding, the decoded 2D frame can be mapped back to the corresponding 3D surface, for example, a sphere for an equi-rectangular mapping or a cube for cube mapping. The 3D surface can then be projected onto a "virtual screen" corresponding to a user's viewpoint in order to obtain the final rendered frame. The steps of decoding the 2D frame and projecting from the 3D surface to a rendered frame can be merged into a single step, where a part of the decoded frame is mapped onto the rendered frame.

For simplicity of notation, we may refer to the decoded 2D frame also as "F," and the 3D surface used in rendering also as S. It should be understood that the 2D frame to be encoded and the 2D frame to be decoded may be different due to video compression, and the 3D surface in pre-processing and the 3D surface in rendering may also be different. The terms "mapping" and "projection" may be used interchangeably, the terms "pixel" and "sample" may be used interchangeably, and the terms "frame" and "picture" may be used interchangeably.

FIG. 5A illustrates a flowchart of a method for encoding an omnidirectional video into a bitstream according to a specific and non-limiting embodiment. Here, it is assumed that the pictures of an omnidirectional video are represented as 3D surfaces, such as but not limited to a sphere or a cube. The 3D surface S is then projected onto at least one 2D picture F using a projection function Pf. For instance, such a projection function Pf could be an equi-rectangular projection function or other type of projection function.
The 2D picture is then divided into blocks and each block is encoded using motion vector prediction techniques.

In step S500, a motion vector predictor dP is determined for the current block BLK from at least one neighbor motion vector dV of a neighbor block using at least the projection function Pf used to project the 3D surface S representing the omnidirectional video onto the 2D picture F. In a variant, a motion vector predictor is determined from each motion vector of several neighbor blocks using at least the projection function Pf.

In step S502, the current block BLK is encoded from the motion vector predictor(s) dP instead of using directly the neighbor motion vector(s) dV. In the case where several motion vector predictors are determined at step S500, a single motion vector predictor dP is obtained from the list of several motion vector predictors.

The motion vector predictor dP may be used for predicting the motion vector MV assigned to the current block BLK. In this case, the motion vector MV is used for motion-compensating the current block BLK in a reference frame of the projected omnidirectional video in order to compute a block residue for the block BLK. In addition, a motion vector difference also known as motion vector residue MVD is encoded for the current block, wherein MVD=MV−dP. In a variant, the motion vector predictor dP may be used directly for motion-compensating the current block BLK in a reference frame of the projected omnidirectional video for computing a block residue for the block BLK. In this latter case, no motion vector difference is encoded and MV=dP.

FIG. 5B illustrates a flowchart of a method for decoding a bitstream representative of a coded omnidirectional video, according to a specific and non-limiting embodiment.

In step S504, a motion vector predictor dP is determined for the current block BLK from the motion vector dV using at least the projection function used to project the 3D surface representing the omnidirectional video onto the 2D picture as it is done on the encoder side in step S500. In a variant, a motion vector predictor is determined from each motion vector of several neighbor blocks using at least the projection function Pf.

In step S506, the current block BLK is decoded using the motion vector predictor dP. In the case where several motion vector predictors are determined at step S500, a single motion vector predictor dP is obtained from the list of several motion vector predictors. Depending on the coding mode used to code the current block BLK, the motion vector predictor dP may be used for reconstructing a motion vector MV of the current block BLK from a motion vector residue MVD decoded from the bitstream, i.e. MV=dP+MVD. In a variant, the motion vector predictor dP may be used directly, i.e. MV=dP, for motion-compensating the current block BLK in a reference frame of the projected omnidirectional video for reconstructing the current block BLK from a block residue decoded from the bitstream.

FIG. 6A illustrates a block BLK of the 2D picture to encode and a motion vector dV of a neighbor block of the block BLK, namely the top neighbor block of the block BLK. In a variant, the neighbor block may be a left block, a top-left block, a top block, etc. Such motion vector dV may be used for predicting a motion vector assigned to the current block BLK. The motion vector dV may thus be used as a motion vector predictor dP of the motion vector MV of the current block BLK. Advantagesouly, the motion vector dV is transformed by the method S700 of FIG. 7A into a motion vector dP to be used as a motion vector predictor for the current block BLK. The point V is located at the center of the neighbor block. The point P may be the center of the current block BLK as depicted on FIG. 6A, or the top-left pixel of the block BLK, or any other point of the block BLK.

FIG. 6B illustrates a block BLK of the 2D picture to encode with which a motion vector dV is associated and sub-blocks of the block BLK. The motion vector dV may be used to determine a motion vector dP for each sub-block of the block BLK. Advantagesouly, the motion vector dV of the current block is transformed by the method S700 of FIG. 7A into a motion vector dP to be used as a motion vector for a sub-block. In this case, the motion vector dV is the one of the block, the point V is at the center of the block BLK and the point P is at the center of the sub-block under consideration.

FIG. 7A illustrates a flowchart of a method S700 for transforming a motion vector dV associated with a block of the 2D picture F into a motion vector dP associated with another block responsive to the projection function according to a specific and non-limiting embodiment. For convenience, the method S700 is disclosed below in the specific case where dV is a motion vector of a neighbor block of a current block BLK to encode (FIG. 6A) and dP is a motion vector predictor of the current block BLK. However, the method S700 may also be applied in the specific case where dV is a motion vector of the current block BLK (FIG. 6B) and dP is a motion vector of a sub-block of the current block BLK.

According to this embodiment, the motion vector predictor dV is expressed in the coordinate reference system of the 2D picture F. In the following, P is defined as a point of the current block BLK and V is defined as a point of the neighbor block. The neighbor block may be smaller than the current block BLK. For instance, the point P may be the center of the current block BLK as depicted on FIG. 6, or the top-left pixel of the block BLK, or any other point of the block BLK. The point V is the center of the neighbor block. The motion vector predictor dP obtained is then used for coding the whole block BLK. FIGS. 8A to 8C further illustrate the method S700.

In step S702, the point P is projected from the 2D picture F to the 3D surface S. The projected point is denoted P''' on FIGS. 8A and 8B and thus P'''=T(P). T is defined as follows in the case of an equi-rectangular projection:
T:M(x,y)→M'''(X,Y,Z) where M is a point from the 2D picture F and M''' is a corresponding point on the 3D surface.

$$M''' = \begin{bmatrix} \sin(\varphi)\cos(\theta) \\ \sin(\varphi)\sin(\theta) \\ \cos(\varphi) \end{bmatrix} \quad \text{(eq. 1)}$$

where $$\theta = \frac{2\pi}{w}x, \varphi = \frac{\pi}{h}y,$$

w and h are the picture width and height and where x and y the pixel coordinates of M in the 2D picture F.
The pixel coordinates are in floating point here, that is:

$$x = \bar{x} + \tfrac{1}{2}\ y = \bar{y} + \tfrac{1}{2}$$

where $\bar{x}$, $\bar{y}$ are integer pixel coordinates.
The inverse function $T^{-1}$ is defined as:

$$T^{-1}: M'''(X,Y,Z) \rightarrow M(x,y)$$

$T^{-1}$ is thus the projection function Pf, which projects points of the 3D surface S onto the 2D frame F.

$$\begin{cases} \theta = a\tan\left(\dfrac{Y}{X}\right) \\ \varphi = a\tan\left(\dfrac{\sqrt{X^2+Y^2}}{Z}\right) \end{cases} \quad \text{(eq. 2)}$$

where $$x = \frac{w}{2\pi}\theta \text{ and } y = \frac{h}{n}\varphi.$$

Other projection functions may be used, e.g. Equal-Area Projection function.

In step S704, V is projected from the 2D picture F to the 3D surface S. The projected point is denoted V''' on FIGS. 8A and 8B and thus V'''=T(V).

In step S706, a point W is obtained wherein W is the point V displaced by the motion vector dV, i.e. W=V+dV.

In step S708, W is projected from the 2D picture F to the 3D surface S. The projected point is denoted W''' on FIGS. 8A and 8B and thus W'''=T(W).

In step S710, an intersection Vp between the vector OV''' and a plane G is determined, wherein the plane G is tangent to the 3D surface S at point P'''. The point Vp is a point of the 3D space and is defined such that the vector OVp is equal to $$\frac{1}{\overline{OP'''}.\overline{OV'''}} OV''',$$

where OP'''. OV''' is a scalar product. O is the origin of the 3D coordinate system, e.g. O is the center of the sphere.

In step S712, an intersection Wp between the vector OW''' and the plane G is determined. The point Wp is a point of the 3D space that is defined such that the vector OWp is equal to $$\frac{1}{\overline{OP'''}.\overline{OW'''}} OW''',$$

where OP'''. OW''' is a scalar product.

In step S714, a motion vector dVp is determined as a displacement vector between the points Vp and Wp, i.e. dVp=OWp−OVp.

In step S716, the point Qp=P'''+dVp is thus determined. Qp is the point P''' of the plane G displaced by the motion vector dVp.

In step S718, the point Qp is projected back in the 2D picture F in a point Q, i.e. $Q=T^{-1}(Qp)=T^{-1}(Q''')$. All points located on a given radius of the sphere, e.g. Qp and Q''', are projected on the same point in the frame F.

In step S720, the motion vector predictor dP is set equal to the vector PQ.

The transformation T can be defined once for the whole video since the projection function Pf is fixed for the video and encoded at a sequence level. The result of this computation can be stored in a LUT (Look-Up Table) in order to reduce computational complexity. Such a LUT makes it possible to derive for each point of the 2D picture a corresponding point on the surface S and inversely.

In order to implement a fast and bit-accurate version of the above method S700, an integer version of the above method S700 using trigonometric LUTs and arithmetic operations may be used according to a specific and non-limiting embodiment.

To this aim, a pre-processing step S690 is applied prior to the method S700 to avoid integer overflow as illustrated by FIG. 7B. The method S700 does not depend on the absolute position on x-axis of P and V but only on their relative position. Therefore, in order to keep the X component large enough in eq. 2 and thus to avoid integer overflow during the division, θ is chosen close to 0, i.e. x close to 0. Therefore, the following pre-processing step S690 is applied before the method S700:

$$M(x,y) \rightarrow M'(x',y')$$

$$x' = x - Px$$

where Px is the x coordinate of point P.
It consists in using P as horizontal origin instead of a fix horizontal origin (for example the image center or the first column of the image).
This leads to the following simplification of the coordinates of P''':

$$P''' = \begin{bmatrix} \sin(\varphi) \\ 0 \\ \cos(\varphi) \end{bmatrix}$$

The dot product is simplified as follows:

$$OP'''\cdot OM''' = X_{P'''}*X_{M'''} + Z_{P'''}*Z_{M'''}$$

where $P'''=[X_{P'''}, Y_{P'''}, Z_{P'''}]$ and $M'''=[X_{M'''}, Y_{M'''}, Z_{M'''}]$ are the projected points P and M onto the sphere.
Geometrically, one can notice that the transformation of the motion vector dV is of larger amplitude near the pole, i.e. dV is more distorted near the pole. On the other hand, in eq2, Z must be kept large enough to avoid numerical instability, or for a better integer implementation. To keep Z large, φ must be far from +π/2, corresponding to a coordinate near the equator. To this aim, the transformation process of dV into dP according to the method S700 may be deactivated when any of P(Px, Py), V(Vx, Vy) or W(Wx, Wy) is close to the equator, that is, when one of the following conditions is true:

$$\begin{cases} Py > \frac{h}{2} - H \text{ and } Py < \frac{h}{2} + H \\ Vy > \frac{h}{2} - H \text{ and } Vy < \frac{h}{2} + H \\ Wy > \frac{h}{2} - H \text{ and } Wy < \frac{h}{2} + H \end{cases}$$

where H is a value, for example H=h/4.
The motion vector transformation induced by the method S700 has some symmetry which is used for fast LUT implementation. This symmetry makes it possible to define, in a specific and non-limiting embodiment, a LUT for only a portion of the 2D picture F and to transform any motion vector dV of the 2D picture F using this LUT.
If Py>h/2, we apply the following pre-processing, in step S690, on P and V:

$$M(x, y) \to M'(x', y')$$

$$y' = \frac{h}{2} - y$$

and dV(dVx,dVy) is transformed into dV'(dVx,−dVy). The method S700 is thus applied on dV'.
A symmetric post-processing is applied, e.g. in step S790, on dP(dx,dy) which is transformed into dP'(dx,−dy) as illustrated by FIG. 7B.

The equation (eq1), involved in steps S702, S704 and S708 of the method S700 may be implemented using a unique Look-Up-Table (LUT) called LUT$^s$ of the sine table from [0,π/2] to [0,1]. The cos(x) function is simply deduced as sin(π/2−x) from the LUT$^s$.
In another embodiment, a 2D LUT mapping directly each pixel of the ERP image to a 3D point M(x,y,z) is computed. Steps S706, S714, S716 and S720 of the method S700 only involve addition or subtraction of motion vectors.
Steps S710 and S712 of the method S700 involve a dot product of 3D vectors (hence multiplications and additions), and a division of each components of the vector by the dot product.
Step S718 of the method S700 is implemented using a LUT called LUT$^t$ of a tan from [0,N] to [0,a tan(N)] where N is a fixed maximum value for the LUT. For values larger than N, the value is set to (π/2+a tan(N))/2.

FIGS. 9 to 15 described below illustrates pre-processing and post-processing steps to be applied before and after the method S700. It will be appreciated, however, that the pre-processing and post-processing methods disclosed with respect to FIGS. 9 to 15 are not restricted to the specific method S700 of motion vector transformation disclosed with respect to FIG. 7A. Indeed, the pre-processing and post-processing methods may apply to other methods used for transforming a motion vector dV associated with a block of the 2D picture F into a motion vector dP associated with another block responsive to a projection function. In particular, these pre-processing and post-processing methods disclosed may be used in combination with the methods illustrated by FIG. 7, 11 or 14 in the EP patent application EP2016306268 filed on Sep. 30, 2016.

Figure 9:
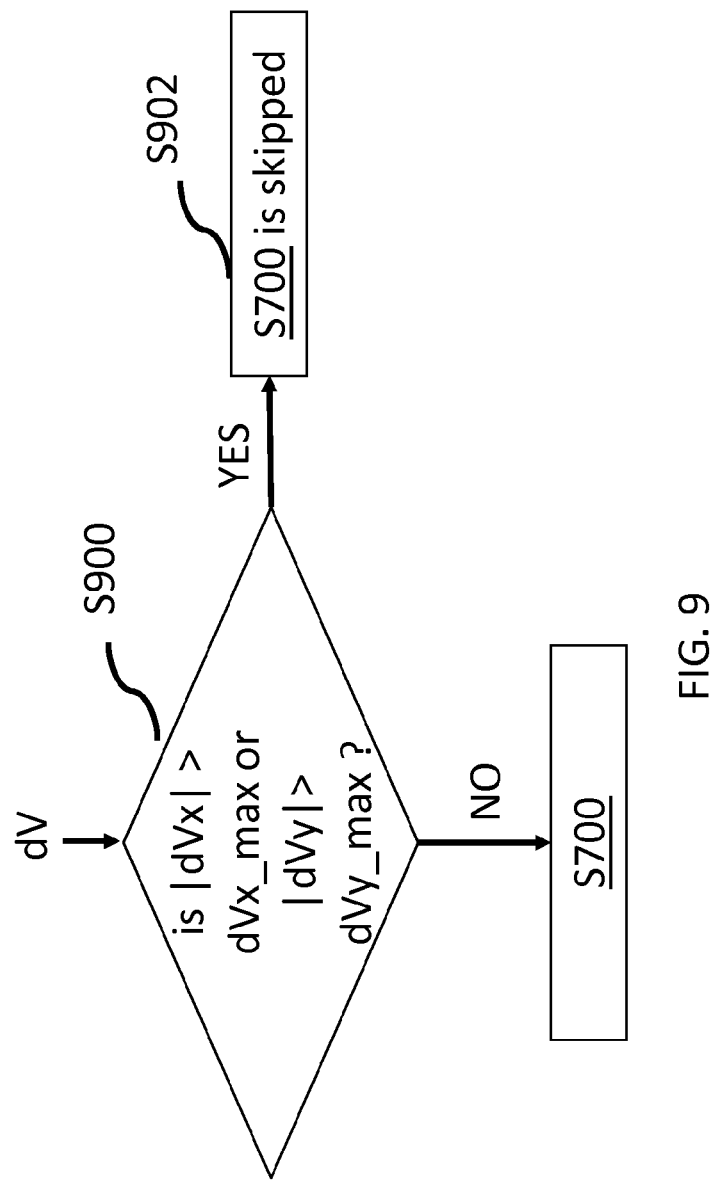

FIG. 9 illustrates a flowchart of a method for transforming a motion vector dV associated with a block of the 2D picture F into a motion vector dP associated with another block responsive to the projection function according to another specific and non-limiting embodiment embodiment.

In step S900, the absolute value of the components (dVx, dVy) of dV are compared with values dVx_max and dVy_max respectively. In the case where |dVx| is larger than dVx_max or |dVy| is larger than dVy_max, the method S700 is not applied (step S902), i.e. it is skipped. In this case, the motion vector predictor dP for the current block is determined classically without considering the projection function as in the method S700, e.g. dP=dV.
Otherwise, the method S700 is applied to determine the motion vector predictor dP for the current block.
The maximum relative difference on each coordinate between P and V is equal to the size of a CTU (English acronym for Coding Tree Unit). The CTU as defined in HEVC is the largest considered coding unit. Given the geometric reasoning in S700, the maximum absolute motion vector is set to a pre-defined maximum limit, for example corresponding to an angular difference of 45 degrees=π/4. Given the definitions of θ and φ, such limit is converted into pixel unit as follows:

$$dV_{max} = [\text{dVx\_max, dVy\_max}] = \left[\frac{w}{8}, \frac{h}{4}\right]$$

where w is the width of the picture and h is the height of the picture.
The steps S900 and S902 may be applied in the pre-processing step S690.

Figure 10:
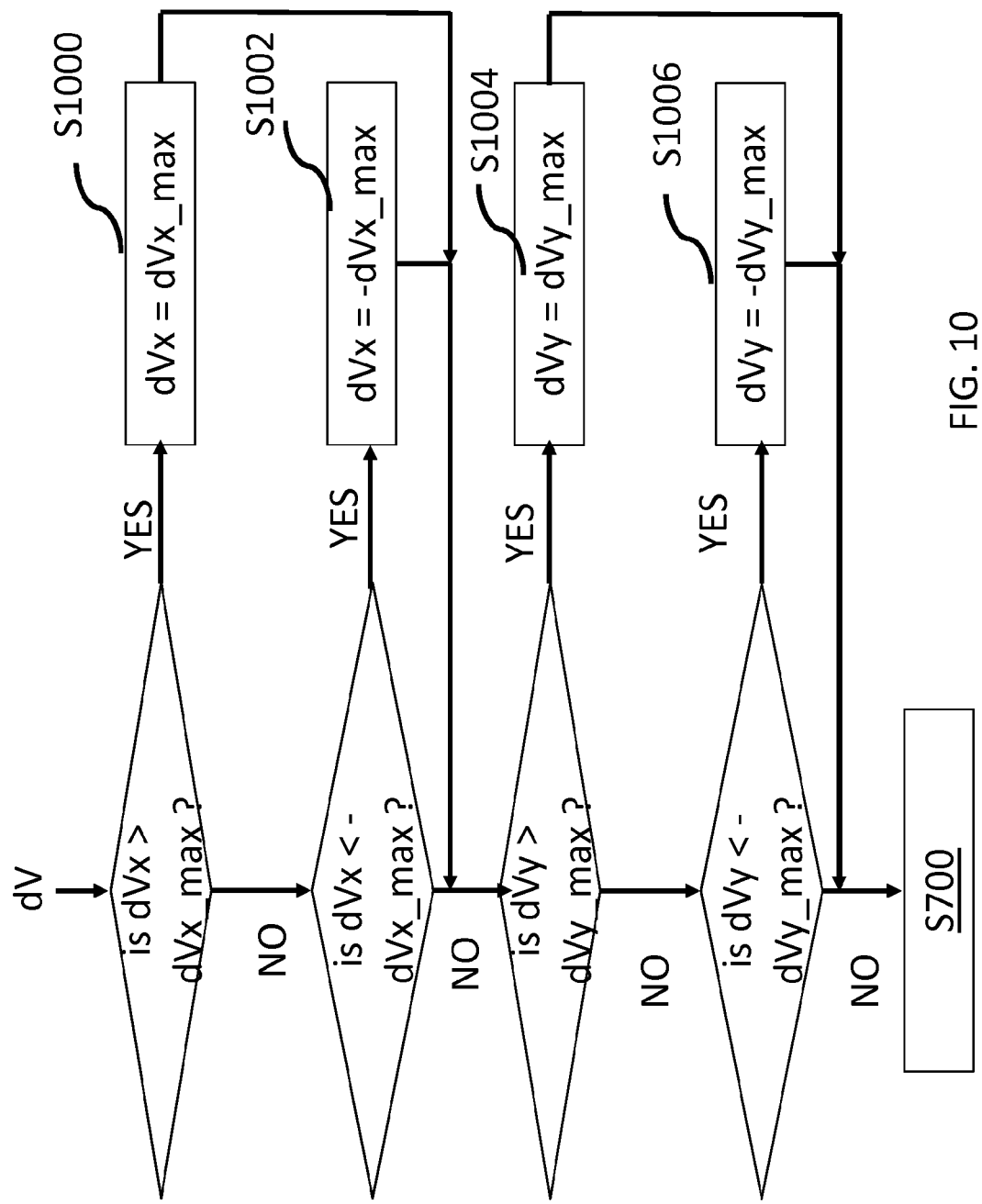

FIG. 10 illustrates a flowchart of a method for transforming a motion vector dV associated with a block of the 2D picture F into a motion vector dP associated with another block responsive to the projection function according to yet another embodiment. In this embodiment, the components of the neighbor motion vector dV are clipped before the method S700 is applied in the case where their absolute values are larger than dVx_max and dVy_max respectively. In the case where, dVx>dVx_max, dVx is set equal to dVx_max in step S1000. Otherwise, in the case where dVx<−dVx_max, dVx is set equal to −dVx_max in step S1002.
Otherwise, in the case where dVy>dVy_max, dVy is set equal to dVy_max in step S1004.
Otherwise, in the case where dVy<−dVy_max, dVy is set equal to −dVy_max in step S1006.
This ensures that the components of dV are smaller than the values dVx_max and dVy_max respectively when the method S700 applies.
The steps S1000 to S1006 may be applied in the pre-processing step S690.

Figure 11:
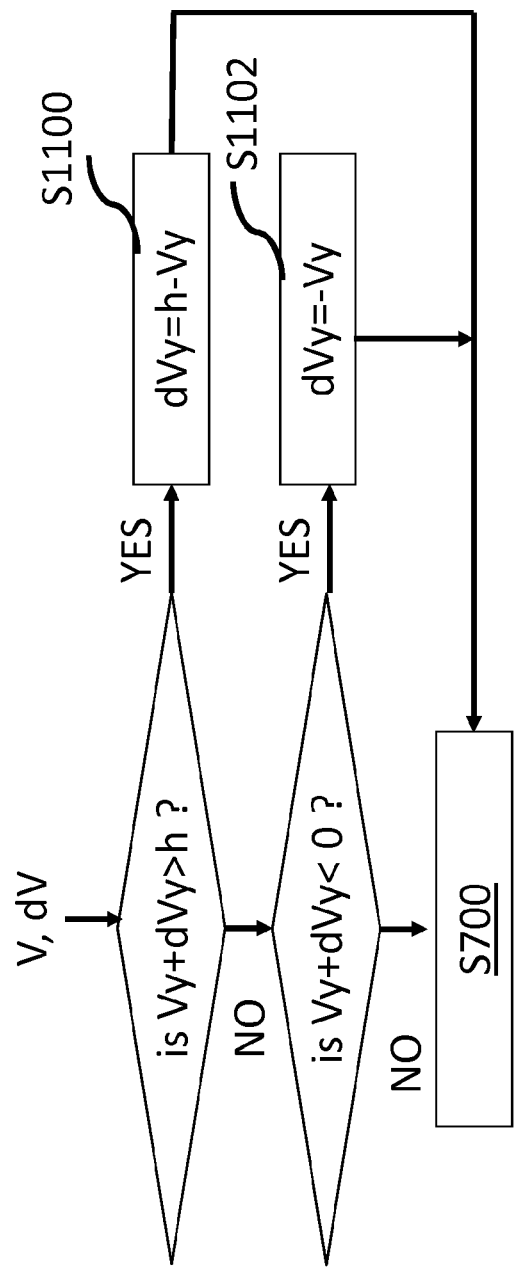

FIG. 11 illustrates a flowchart of a method for transforming a motion vector dV associated with a block of the 2D picture F into a motion vector dP associated with another block responsive to the projection function according to yet another embodiment.
In HEVC, motion compensated blocks are allowed to go beyond the image boundaries thanks to UMC tool (UMC is the English acronym for Unlimited Motion Compensation). For ERP images, it would be preferable to forbid such vector predictor when crossing the top (resp. bottom) boundary of the image. To this aim, the components of dV are modified as follows:
In the case where Vy+dVy>h, dVy is set equal to h−Vy at step S1100.
In the case where Vy+dVy<0, dVy is set equal to −Vy at step S1102. (Vx, Vy) are the coordinates of V.

The steps S1100 to S1102 may be applied in the preprocessing step S690.

FIG. 12 illustrates a flowchart of a method for for transforming a motion vector dV associated with a block of the 2D picture F into a motion vector dP associated with another block responsive to the projection function according to yet another embodiment.

In this embodiment, the components of the motion vector predictor dP obtained by the method S700 are clipped in the case where the difference between one component of the input vector dV and the corresponding component of the motion vector predictor dP is larger than a value Th.

In the case where dPx−dVx>Th, dPx is set equal to dVx+Th in step S1200.

In the case where dPx−dVx<−Th, dPx is set equal to dVx−Th in step S1202.

In the case where dPy−dVy>Th, dPy is set equal to dVy+Th in step S1204.

In the case where dPy−dVy<−Th, dPy is set equal to dVy−Th in step S1206.

The steps S1200 to S1206 may be applied in the post-processing step S790.

FIG. 13 illustrates a flowchart of a method for transforming a motion vector dV associated with a block of the 2D picture F into a motion vector dP associated with another block responsive to the projection function according to yet another embodiment. This embodiment is similar to the embodiment of FIG. 11 but applies to the output vector dP of method S700.

In the case where Py+dPy>h, dPy is set equal to h−Py at step S1300.

In the case where Py+dPy<0, dPy is set equal to −Py at step S1302.

(Px, Py) are the coordinates of P.

The steps S1300 to S1302 may be applied in the post-processing step S790.

FIG. 14A illustrates a flowchart of a method for transforming a motion vector dV associated with a block of the 2D picture F into a motion vector dP associated with another block responsive to the projection function according to yet another embodiment.

For left boundaries (right boundaries respectively), as the image is periodic horizontally, one can always modify a motion vector such that the motion compensated block lies inside the image. Another variant consists in applying the regular UMC process and constraining the motion vector so that the motion compensated block lies inside an area composed of the image extended by one block (e.g. by one CTU) of size C. Thus, in a specific embodiment, the components of the motion vector dP are clipped so that the motion vector dP lies inside an area composed of the image extended by one block as illustrated by FIG. 14B.

In the case where Px+dPx>w+C, dPx is set equal to w+C−Px at step S1400.

In the case where Px+dPx<−C, dPx is set equal to =−C−Px at step S1402.

Where C is the size of the block and for example, C=64 or C=128.

The steps S1400 to S1402 may be applied in the post-processing step S790.

In yet another embodiment, the motion vector predictor dP obtained by the method S700 is discarded in the case where the following condition is true:

$$\text{sign}(Px''') \neq \text{sign}(Qx''') \text{ and } \text{sign}(Py''') \neq \text{sign}(Qx''')$$

with P'''=[Px''', Py'''] and Q'''=[Qx''', Qy'''], Q'''=T(Q)

Indeed, when the point P is close to the pole (i.e. close to the top or bottom of the ERP image), the computed vector dP can set the point on the other side of the sphere as depicted on FIG. 15. In a variant, the components of the motion vector predictor dP are clipped to have the point P in the same quadrant as P+dP.

FIG. 16 is a schematic block diagram illustrating an exemplary video encoder 400. Such a video encoder 400 performs the encoding into a bitstream of a set of pictures representative of a projection of an omnidirectional video. Classically, the video encoder 400 may include several modules for block-based video encoding, as illustrated in FIG. 16. A 2D picture I representative of a projected picture from an omnidirectional video to be encoded is input to the encoder 400.

The picture I is subdivided into a set of blocks of pixels BLK.

The encoding process described below processes each block BLK of the picture I. Depending on the video coding standard used, such a block BLK may correspond to an H.264/AVC macroblock, or an HEVC coding tree unit, or any sub-block from one of the units described above, or any other layout of subdivision of picture I.

The encoding and decoding processes described below are for illustration purposes. According to some embodiments, encoding or decoding modules may be added, or removed or may vary from the following modules. However, the principle disclosed herein could still be applied to these embodiments.

The encoder 400 performs encoding of each block BLK of the picture I as follows. The encoder 400 comprises a mode selection unit for selecting a coding mode for a block BLK of a picture to be coded, e.g. based on a rate/distortion optimization. Such a mode selection unit comprises:
- a motion estimation module for estimating motion between one current block of the picture to be coded and reference pictures,
- a motion compensation module for predicting the current block using the estimated motion,
- an intra prediction module for spatially predicting the current block.

The mode selection unit may also decide whether subdivision of the block is needed according to rate/distortion optimization for instance. In that case, the mode selection unit then operates for each sub-block of the block BLK.

In case of inter-prediction of the current block BLK, the mode selection unit may determine a motion vector predictor dP for the current block BLK by applying the method S700 or one of its variants.

For instance, a motion vector predictor dP for the current block BLK may be used for predicting a motion vector MV estimated for the current block BLK by computing a motion vector residue as a difference between MV and dP. The motion vector residue is then encoded by the entropy coding module.

In a variant, the motion vector predictor dP is used directly for predicting the current block BLK by motion-compensating the current block BLK in a 2D reference frame representative of a reference surface of the omnidirectional. In this case no motion vector residue is encoded.

In the case where the current block BLK has several neighbor blocks available for prediction (e.g. left block, top block or top-left block), a motion vector predictor may be determined by the method S700 or one of its variants for each neighbor motion vector dV. Then, a single motion vector predictor may be obtained for the block BLK from the plurality of motion vector predictors. The resulting single motion vector predictor is then used in a classical way as the motion vector predictor for the current block BLK.

As an example, a list of motion vector predictors is built for the current block BLK. A single motion vector predictor is then selected from this list and data is coded into the bitstream for indicating the motion vector predictor of the list selected to the decoder. In order to reduce the coding cost of such data, a pruning adaptation of the list may be performed. During this pruning adaptation, some motion vector predictors are removed from the list if they are equal to a motion vector already in the list.

Once a coding mode or coding modes is/are selected for the current block BLK, the mode selection unit delivers a predicted block PRED and corresponding syntax elements to be coded in the bitstream for performing the same block prediction at the decoder. When the current block BLK has been split, the predicted block PRED is formed by the set of predicted sub-blocks delivered by the mode selection unit for each sub-block.

A residual block RES is then obtained by subtracting the predicted block PRED from the original block BLK.

The residual block RES is then transformed by a transform processing module delivering a transform block TCOEF of transformed coefficients. In case, the transform processing module operates on transform blocks of size smaller than the residual block RES, the transform processing module delivers a set of corresponding transform blocks TCOEF. For instance, a rate/distortion optimization may be performed to decide whether large transform block or smaller transform block should be used. In case of an HEVC coder, the transform processing module operates on block called transform unit (TU).

Each delivered transform block TCOEF is then quantized by a quantization module delivering a quantized transform block QCOEF of quantized residual transform coefficients.

The syntax elements and quantized residual transform coefficients of the block QCOEF are then input to an entropy coding module to deliver the coded video data of the bitstream STR.

The quantized residual transform coefficients of the quantized transform block QCOEF are processed by an inverse quantization module delivering a block TCOEF' of dequantized transform coefficients. The block TCOEF' is passed to an inverse transform module for reconstructing a block of residual prediction RES'.

A reconstructed version REC of the block BLK is then obtained by adding the prediction block PRED to the reconstructed residual prediction block RES'. The reconstructed block REC is stored in memory for later use by a picture reconstruction module for reconstructing a decoded version I' of the picture I. Once all the blocks BLK of the picture I have been coded, the picture reconstruction module performs reconstruction of a decoded version I' of the picture I from the reconstructed blocks REC. Optionally, filtering may be applied to the reconstructed picture I' for removing coding artifacts to reconstructed blocks.

Once the reconstructed picture I' has been reconstructed and eventually filtered, the resulting reconstructed picture is then added to a reference picture memory for later use as a reference picture for encoding the following pictures of the set of pictures to code.

The bitstream generated from the above-described encoding process is then transmitted over a data network or stored on a memory for immersive rendering of an omnidirectional video decoded from the bitstream STR.

Any one of the embodiment of the methods disclosed above can be implemented in an exemplary decoder for decoding a bitstream representative of an omnidirectional video, such as disclosed below, according to a specific and non-limiting embodiment.

FIG. 17 is a schematic block diagram illustrating an exemplary video decoder method according to a specific and non-limiting embodiment. A bitstream STR representative of coded pictures representative of a projection of an omnidirectional video onto said 2D picture comprises coded data representative of at least one current block BLK of said 2D picture.

According to an embodiment, the bitstream STR may also comprise coded data representative of an item of information relating to the projection function Pf.

The video decoder 700 performs the reconstruction of the omnidirectional video by decoding from the bitstream the coded pictures on a picture-by-picture basis and by decoding each picture on a block-by-block basis. According to the video compression scheme used, parallel processing may be used for decoding the bitstream either on a picture basis or on a block basis. A picture I' is thus reconstructed from the compressed bitstream as follows.

The coded data is passed to the video decoding modules of the video decoder 700 for reconstructing the blocks of the picture I'.

As illustrated in FIG. 17, coded data is passed to an entropy decoding module that performs entropy decoding and delivers a block QCOEF of quantized transform coefficients to an inverse quantization module and syntax elements to a prediction module.

After entropy decoding, the block QCOEF of quantized transform coefficients is inverse quantized by the inverse quantization module to deliver a block TCOEF' of dequantized transform coefficients.

The block TCOEF' of dequantized transform coefficients is inverse transformed by an inverse transform module delivering a residual prediction block RES'.

The prediction module builds a prediction block PRED according to the syntax element and using a motion compensation module if a current block has been inter-predicted or an intra prediction module if the current block has been spatially predicted.

In case of inter-prediction of the current block BLK, the mode selection unit may determine a motion vector predictor dP of the current block BLK according to the method S700 or one of its variants.

For instance, a motion vector predictor dP for the current block BLK may be used for reconstructing a motion vector MV for the current block BLK by adding a motion vector residue decoded from the bitstream to the motion vector predictor dP. The motion vector residue is then encoded by the entropy coding module.

In a variant, the motion vector predictor dP is used directly for predicting the current block BLK by motion-compensating the current block BLK in a 2D reference frame representative of a reference surface of the omnidirectional. In this case no motion vector residue is decoded.

In the case where the current block BLK has several neighbor blocks available for prediction (e.g. left block, top block or top-left block), a motion vector predictor may be determined by the method S700 or one of its variants for each neighbor motion vector dV. Then, a single motion vector predictor may be obtained for the block BLK from the plurality of motion vector predictors. The resulting single motion vector predictor is then used in a classical way as the motion vector predictor for the current block BLK.

As an example, a list of motion vector predictors is built for the current block BLK. A single motion vector predictor is then selected from this list and data is coded into the bitstream for indicating the motion vector predictor of the list selected to the decoder. In order to reduce the coding cost of such data, a pruning adaptation of the list may be performed. During this pruning adaptation, some motion vector predictors are removed from the list if they are equal to a motion vector already in the list.

A reconstructed block REC is then obtained by adding the prediction block PRED to the reconstructed residual prediction block RES'. The reconstructed block REC is stored in memory for later use by a picture reconstruction module for reconstructing a decoded picture I'. Once all the blocks of the picture I have been decoded, the picture reconstruction module performs reconstruction of the decoded picture I' from the reconstructed blocks REC. Optionally, filtering may be applied to the reconstructed picture I' for removing coding artifacts to reconstructed blocks.

The reconstructed picture I' is then added to a reference picture memory for later use as a reference picture for decoding the following pictures of the set of pictures to decode.

The reconstructed picture I' is then stored on a memory or output by the video decoder apparatus 700 to an immersive rendering device. The video decoder apparatus 700 may also be comprised in the immersive rendering device. In that case, the reconstructed picture I' is output by the decoder apparatus to a display module of the immersive rendering device.

According to the immersive rendering system implemented, the disclosed decoder apparatus may be comprised in any one of the processing devices of an immersive rendering system such as disclosed herein for instance, in a computer, or a game console, or a smartphone, or an immersive rendering device, or an immersive wall.

The apparatus decoder 700 may be implemented as hardware or software or a combination of hardware and software thereof.

FIG. 18 illustrates the simplified structure of an apparatus (400) for coding an omnidirectional video according to a specific and non-limiting embodiment. Such an apparatus is configured to implement the method for coding an omnidirectional video according to any embodiment described here above.

According to an embodiment, the encoder apparatus comprises a processing unit PROC equipped for example with a processor and driven by a computer program PG stored in a memory MEM and implementing the method for coding an omnidirectional video.

At initialization, the code instructions of the computer program PG are for example loaded into a RAM (not shown) and then executed by the processor of the processing unit PROC. The processor of the processing unit PROC implements the steps of the method for coding an omnidirectional video which have been described here above, according to the instructions of the computer program PG.

The encoder apparatus comprises a communication unit COMOUT to transmit an encoded bitstream STR to a data network.

The encoder apparatus also comprises an interface COMIN for receiving a picture to be coded or an omnidirectional video to encode.

FIG. 19 illustrates the simplified structure of an apparatus (700) for decoding a bitstream representative of an omnidirectional video according to a specific and non-limiting embodiment. Such an apparatus is configured to implement the method for decoding a bitstream representative of an omnidirectional video according to any embodiment described here above.

According to an embodiment, the decoder apparatus comprises a processing unit PROC equipped for example with a processor and driven by a computer program PG stored in a memory MEM and implementing the method for decoding a bitstream representative of an omnidirectional video.

At initialization, the code instructions of the computer program PG are for example loaded into a RAM (not shown) and then executed by the processor of the processing unit PROC. The processor of the processing unit PROC implements the steps of the method for decoding a bitstream representative of an omnidirectional video which has been described here above, according to the instructions of the computer program PG.

The apparatus may comprise a communication unit COMOUT to transmit the reconstructed pictures of the video data to a rendering device.

The apparatus also comprises an interface COMIN for receiving a bitstream STR representative of the omnidirectional video to decode from a data network, or a gateway, or a Set-Top-Box.

The apparatus 400 and 700 may be located in separate devices, or in the same device that acts as both a receiver and a transmitter.

FIG. 20 illustrates a block diagram of an exemplary system 1700 in which various aspects of the exemplary embodiments may be implemented. System 1700 may be embodied as a device including the various components described below and is configured to perform the processes described above. Examples of such devices, include, but are not limited to, HMDs, personal computers, laptop computers, smartphones, tablet computers, digital multimedia set top boxes, digital television receivers, personal video recording systems, connected home appliances, and servers. System 1700 may comprise sensors, and may be communicatively coupled to other similar systems via a communication channel as shown in FIG. 20 and as known by those skilled in the art to implement the exemplary video system described above.

The system 1700 may include at least one processor 1710 configured to execute instructions loaded therein for implementing the various processes as discussed above. Processor 1710 may include embedded memory, input output interface and various other circuitries as known in the art. The system 1700 may also include at least one memory 1720 (e.g., a volatile memory device, a non-volatile memory device). System 1700 may additionally include a storage device 1740, which may include non-volatile memory, including, but not limited to, EEPROM, ROM, PROM, RAM, DRAM, SRAM, flash, magnetic disk drive, and/or optical disk drive. The storage device 1740 may comprise an internal storage device, an attached storage device and/or a network accessible storage device, as non-limiting examples. System 1700 may also include an encoder/decoder module 1730 configured to process data to provide an encoded video or decoded video.

Encoder/decoder module 1730 represents the module(s) that may be included in a device to perform the encoding and/or decoding functions. Encoder 400 and decoder 700 may be used in encoder/decoder module 1730. As is known, a device may include one or both of the encoding and decoding modules. Additionally, encoder/decoder module 1730 may be implemented as a separate element of system 1700 or may be incorporated within processors 1710 as a combination of hardware and software as known to those skilled in the art.

System 1700 may further include a display (1790) or may be communicatively coupled to the display via the communication channel. The display is, for example of OLED or LCD type. The display can also be an immersive (projective) wall, which is usually of a huge size.

System 1700 may further comprise a touch surface 1780 (e.g. a touchpad or a tactile screen) and a camera 1770. Processor 1710 may process signals received from sensors, which may or may not be part of system 1700. Some of the measurements from sensors can be used to compute the pose of system 1700 or of another device connected to system 1700. Camera 1770 may capture images of the environment for image processing. Processor 1710 may also perform the pre-processing and post-processing functions as described in FIG. 1.

Program code to be loaded onto processors 1710 to perform the various processes described hereinabove may be stored in storage device 1740 and subsequently loaded onto memory 1720 for execution by processors 1710. In accordance with the exemplary embodiments, one or more of the processor(s) 1710, memory 1720, storage device 1740 and encoder/decoder module 1730 may store one or more of the various items during the performance of the processes discussed herein above, including, but not limited to the input video, the bitstream, equations, formula, matrices, variables, operations, and operational logic.

The system 1700 may also include communication interface 1750 that enables communication with other devices via communication channel 1760. The communication interface 1750 may include, but is not limited to a transceiver configured to transmit and receive data from communication channel 1760. The communication interface may include, but is not limited to, a modem or network card and the communication channel may be implemented within a wired and/or wireless medium. The various components of system 1700 may be connected or communicatively coupled together using various suitable connections, including, but not limited to internal buses, wires, and printed circuit boards.

The exemplary embodiments may be carried out by computer software implemented by the processor 1710 or by hardware, or by a combination of hardware and software. As a non-limiting example, the exemplary embodiments may be implemented by one or more integrated circuits. The memory 1720 may be of any type appropriate to the technical environment and may be implemented using any appropriate data storage technology, such as optical memory devices, magnetic memory devices, semiconductor-based memory devices, fixed memory and removable memory, as non-limiting examples. The processor 1710 may be of any type appropriate to the technical environment, and may encompass one or more of microprocessors, general purpose computers, special purpose computers and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for decoding a video, at least one picture of the video being represented as a 3D surface projected onto at least one 2D picture using a projection function, the method comprising, for at least one current block of the 2D picture:

determining whether an absolute value of at least one component of a motion vector (dV) associated with another block of the 2D picture is lower than a value;

responsive to a determination that the absolute value is lower than the value, transforming the motion vector (dV) into a motion vector predictor (dP) of the current block using the projection function;

responsive to a determination that the absolute value is equal to or larger than the value, skipping the transforming of the motion vector or modifying the motion vector by clipping the at least one component so that the absolute value of the at least one component is equal to the value and transforming the modified motion vector into a motion vector predictor of the current block using the projection function; and decoding the current block from the motion vector predictor (dP).

2. The method of claim 1, wherein modifying the motion vector comprises clipping dVy to h−Vy in the case where Vy+dVy is larger than the height h of the picture, and clipping dVy to −Vy in the case where Vy+dVy is lower than 0, where dVy is an ordinate of the motion vector (dV) and Vy is an ordinate of a point V of the another block.

3. The method of claim 1, wherein the value is equal to w/8 or h/4, where w is the width of the picture and h is the height of the picture.

4. The method of claim 1, further comprising after the transforming, determining whether an absolute value of at least one component difference between the motion vector predictor (dP) and the motion vector (dV) is larger than another value and, in the case where the absolute value is larger than the another value, clipping the at least one component of the motion vector predictor (dP) so that the absolute value of the at least one component difference is equal to the another value.

5. The method of claim 1, further comprising after the transforming, clipping dPy to h−Py in the case where Py+dPy is larger than the height of the picture and clipping dPy to −Py in the case where Vy+dVy is lower than 0, where h is the height of the picture, dPy is an ordinate of the motion vector predictor (dP) and Py is an ordinate of a point P of the current block.

6. The method of claim 1, further comprising after the transforming, clipping dPx to w+C−Px in the case where Px+dPx>w+C and clipping dPx to −C−Px in the case where Px+dPx<−C, where w is a width of the picture, C is a value, dPx is an abscissa of the motion vector predictor (dP) and Px is an abscissa of a point P of the current block.

7. The method of claim 1, wherein the 3D surface is a sphere.

8. The method of claim 7, wherein transforming the motion vector (dV) associated with another block of the 2D picture into the motion vector predictor (dP) associated with the current block using the projection function comprises:

projecting on the surface a point P of the current block to a point P‴, a point V of the another block to a point V‴ and the point V of the another block displaced by the motion vector (dV) to a point W‴;

determining an intersection Vp between a vector OV‴ and a plane G and an intersection Wp between a vector OW‴ and the plane G, wherein the plane G is a plane tangent in P‴ to the surface, O is the origin of the sphere;

displacing P‴ by dVp to obtain a point Qp in the plane G, wherein dVp is equal to the vector VpWp;

projecting the point Qp in the 2D picture to a point Q; and determining the motion vector predictor (dP) of the current block as a vector from P to Q.

9. A non-transitory information storage medium storing program code instructions for implementing the method according to claim 1, when the program is executed by a processor.

10. A method for encoding a video, at least one picture of the video being represented as a 3D surface projected onto at least one 2D picture using a projection function, the method comprising, for at least one current block of the 2D picture:

determining whether an absolute value of at least one component of a motion vector (dV) associated with another block of the 2D picture is lower than a value;

responsive to a determination that the absolute value is lower than the value, transforming the motion vector (dV) into a motion vector predictor (dP) of the current block using the projection function;

responsive to a determination that the absolute value is equal to or larger than the value, skipping the transforming of the motion vector or modifying the motion vector by clipping the at least one component so that the absolute value of the at least one component is equal to the value and transforming the modified motion vector into a motion vector predictor of the current block using the projection function; and encoding the current block from the motion vector predictor (dP).

11. A non-transitory information storage medium storing program code instructions for implementing the method according to claim 10, when the program is executed by a processor.

12. An apparatus for decoding a video, at least one picture of the video being represented as a 3D surface projected onto at least one 2D picture using a projection function, the apparatus comprising electronic circuitry adapted for:

determining whether an absolute value of at least one component of a motion vector (dV) associated with another block of the 2D picture is lower than a value;

responsive to a determination that the absolute value is lower than the value, transforming the motion vector (dV) into a motion vector predictor (dP) of the current block using the projection function;

responsive to a determination that the absolute value is equal to or larger than the value, skipping the transforming of the motion vector or modifying the motion vector by clipping the at least one component so that the absolute value of the at least one component is equal to the value and transforming the modified motion vector into a motion vector predictor of the current block using the projection function; and decoding the current block from the motion vector predictor (dP).

13. An immersive rendering device comprising an apparatus for decoding a video according to claim 12.

14. An apparatus for encoding a video, at least one picture of the video being represented as a 3D surface projected onto at least one 2D picture using a projection function, the apparatus comprising electronic circuitry adapted for:

determining whether an absolute value of at least one component of a motion vector (dV) associated with another block of the 2D picture is lower than a value;

responsive to a determination that the absolute value is lower than the value, transforming the motion vector (dV) into a motion vector predictor (dP) of the current block using the projection function;

responsive to a determination that the absolute value is equal to or larger than the value, skipping the transforming of the motion vector or modifying the motion vector by clipping the at least one component so that the absolute value of the at least one component is equal to the value and transforming the modified motion vector into a motion vector predictor of the current block using the projection function; and encoding the current block from the motion vector predictor (dP).

\* \* \* \* \*